US012480332B2

(12) United States Patent
Guerard et al.

(10) Patent No.: US 12,480,332 B2
(45) Date of Patent: *Nov. 25, 2025

(54) SYSTEMS AND METHODS FOR PREVENTING THE OPENING OF A DOOR BY UNAUTHORIZED PERSONNEL

(71) Applicants: David Alexander Guerard, Titusville, NJ (US); Jonathan David Guerard, Titusville, NJ (US)

(72) Inventors: David Alexander Guerard, Titusville, NJ (US); Jonathan David Guerard, Titusville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,698

(22) Filed: Aug. 14, 2023

(65) Prior Publication Data

US 2023/0383571 A1 Nov. 30, 2023

Related U.S. Application Data

(63) Continuation of application No. 17/688,341, filed on Mar. 7, 2022, now Pat. No. 11,725,419, which is a (Continued)

(51) Int. Cl.
*E05B 17/20* (2006.01)
*E05B 35/00* (2006.01)
(Continued)

(52) U.S. Cl.
CPC ........ *E05B 17/2084* (2013.01); *E05B 35/008* (2013.01); *E05B 47/02* (2013.01);
(Continued)

(58) Field of Classification Search
CPC ... E05B 9/002; E05B 9/02; E05B 9/08; E05B 17/0079; E05B 17/2084; E05B 35/008;
(Continued)

(56) References Cited

U.S. PATENT DOCUMENTS 1,744,988 A 1/1930 Shaw
2,717,064 A * 9/1955 Hock .................... E05C 19/001 292/183
(Continued)

OTHER PUBLICATIONS

"Door barricade Nightlock, Home security door brace." Web page <https://www.youtube.com/watch?v=OYBngOjzOwl>, Feb. 25, 2012.
(Continued)

*Primary Examiner* — Christopher J Boswell
(74) *Attorney, Agent, or Firm* — Rita C. Chipperson, Esq.; Chipperson Law Group, P.C.

(57) ABSTRACT

Systems, methods, and apparatus are disclosed involving a door blocking apparatus to reduce a likelihood of, and possibly prevent, opening of a door by unauthorized personnel. The apparatus may be networked in a security system and may be connectable to an online security platform. In a particular embodiment, an embodiment of the invention may include a security system involving a plurality of door locations having a plurality of networked door blocking apparatus. Each door blocking apparatus may include a door blocking mechanism operable by a user on a safety side of a door, such as having the user rotate an apparatus handle that rotates the door blocking mechanism between a non-blocking position and a blocking position. In the non-blocking position, the door blocking apparatus does not block the door from opening and closing. In the blocking position, the door blocking apparatus blocks the door from opening and from closing completely.

20 Claims, 16 Drawing Sheets

Related U.S. Application Data continuation of application No. 17/209,605, filed on Mar. 23, 2021, now Pat. No. 11,268,299.

(60) Provisional application No. 62/993,936, filed on Mar. 24, 2020.

(51) Int. Cl.

| | |
|---|---|
| ***E05B 47/02*** | (2006.01) |
| ***E05B 63/00*** | (2006.01) |
| ***E05C 3/06*** | (2006.01) |
| ***E05C 3/10*** | (2006.01) |
| ***E05C 19/00*** | (2006.01) |
| *E05B 47/00* | (2006.01) |
| *G08B 13/08* | (2006.01) |

(52) U.S. Cl.

CPC ............ *E05B 63/0052* (2013.01); *E05C 3/06* (2013.01); *E05C 3/10* (2013.01); *E05C 19/001* (2013.01); *E05C 19/003* (2013.01); *E05B 47/0012* (2013.01); *E05B 2047/0067* (2013.01); *G08B 13/08* (2013.01)

(58) Field of Classification Search

CPC ................. E05B 47/0012; E05B 47/02; E05B 2047/0067; E05B 2047/0094; E05B 63/0052; E05C 3/06; E05C 3/10; E05C 9/004; E05C 19/001; E05C 19/003; G08B 13/08; G08B 13/19697

See application file for complete search history.

(56) References Cited

U.S. PATENT DOCUMENTS

| | | | | |
|---|---|---|---|---|
| 3,225,575 | A * | 12/1965 | Lucas | E05C 19/001 70/134 |
| 3,768,284 | A * | 10/1973 | Kent | E05B 15/1614 70/448 |
| 4,044,579 | A | 8/1977 | Le Bel | |
| 4,227,386 | A | 10/1980 | Crockett | |
| 4,669,282 | A * | 6/1987 | Hoyt | E05B 63/0052 70/380 |
| 4,844,521 | A * | 7/1989 | Langenbach | E05C 19/001 292/143 |
| D302,937 | S | 8/1989 | Briggs | |
| 5,086,587 | A | 2/1992 | Andrews | |
| 5,732,986 | A | 3/1998 | Piva | |
| 6,446,393 | B1 * | 9/2002 | Marston, Sr. | E05C 9/063 292/196 |
| 6,581,333 | B2 | 6/2003 | Kimball | |
| 6,640,498 | B1 | 11/2003 | Groeneveld | |
| 6,679,533 | B1 | 1/2004 | Bruner et al. | |
| 6,684,570 | B1 | 2/2004 | Robledo | |
| 6,837,082 | B1 | 1/2005 | Moore | |
| 6,860,530 | B2 | 3/2005 | Senn | |
| 7,040,671 | B2 | 5/2006 | Su | |
| 7,255,375 | B2 | 8/2007 | Heid et al. | |
| 7,661,733 | B1 | 2/2010 | Angel | |
| D638,686 | S | 5/2011 | Gordon | |
| 8,925,359 | B2 | 1/2015 | Frankel | |
| D725,290 | S | 3/2015 | Kleiman | |
| D728,346 | S | 5/2015 | James, III | |
| D791,575 | S | 7/2017 | Hochman | |
| 9,790,717 | B2 | 10/2017 | Patterson | |
| D821,608 | S | 6/2018 | Ray, II | |
| 10,030,414 | B1 | 7/2018 | Ozier et al. | |
| 10,316,546 | B1 | 6/2019 | Ozier et al. | |
| 10,385,587 | B1 * | 8/2019 | Heinrich | E05B 17/2003 |
| 11,021,893 | B2 * | 6/2021 | Trout | E05B 47/026 |
| 11,268,299 | B2 * | 3/2022 | Guerard | E05B 63/0052 |
| 11,725,419 | B2 * | 8/2023 | Guerard | E05B 47/02 70/278.7 |
| 2003/0067176 | A1 | 4/2003 | Stevens et al. | |
| 2005/0011241 | A1 | 1/2005 | Underdahl | |
| 2006/0179905 | A1 | 8/2006 | Killins | |
| 2009/0090144 | A1 | 4/2009 | Zarnoti | |
| 2012/0205920 | A1 | 8/2012 | Gold et al. | |
| 2017/0204642 | A1 * | 7/2017 | Tuzzio | E05B 47/0001 |
| 2019/0145139 | A1 | 5/2019 | Keller et al. | |
| 2020/0032554 | A1 | 1/2020 | Berger | |
| 2021/0087852 | A1 | 3/2021 | Trout et al. | |
| 2022/0136286 | A1 * | 5/2022 | Wade, II | E06B 1/12 70/91 |

OTHER PUBLICATIONS

"Reinforcing your doors security with ongard," Web page <https://www.youtube.com/watch?v=hr_ky6oen40>, Oct. 10, 2011.

"How To: Install prime-line's high security door lock," Web page <https://www.youtube.com/watch?v=VTvm_XKeAZM>, Dec. 30, 2014.

* cited by examiner

Computer Environment 120000

SYSTEMS AND METHODS FOR PREVENTING THE OPENING OF A DOOR BY UNAUTHORIZED PERSONNEL

CROSS REFERENCE TO RELATED APPLICATION

This application is a continuation of U.S. patent application Ser. No. 17/688,341 filed on Mar. 7, 2022, now U.S. Pat. No. 11,725,419, issued Aug. 15, 2023, which is a continuation of U.S. patent application Ser. No. 17/209,605 filed on Mar. 23, 2021, now U.S. Pat. No. 11,268,299, issued Mar. 8, 2022, which is a non-provisional application of, and claims the benefit of U.S. Provisional Patent Application Ser. No. 62/993,936 ("the '936 application"), filed Mar. 24, 2020, titled "Systems and Methods for Preventing the Opening of a Door by Unauthorized Personnel," which are incorporated by reference herein in their entirety for all purposes.

BACKGROUND OF THE INVENTION

Embodiments of the present invention generally relate to systems and methods for preventing the opening of a door by unauthorized personnel. Embodiments of the present invention include a door blocking apparatus, wherein blocking a closed door from opening impedes, prevents, or reduces a likelihood of the opening of the closed door by unauthorized personnel. More specifically, the present invention relates to systems and methods for preventing the opening of a door by unauthorized personnel via the following: 1) use of a door blocking mechanism of increased strength; 2) the ability to remove the door blocking mechanism via an emergency key utilized on a keyhole located on the side of the door opposite the door blocking mechanism; 3) via the use of an emergency key having a shape that cannot easily be duplicated; and 4) use of a keyhole that cannot be easily manipulated by tools or devices other than the emergency key.

The invention relates to systems, methods and apparatus involving an online or networked platform, and in a particular embodiment, to a networked system involving a networked door security system comprising at least one door blocking apparatus, at least one network connection, and at least one door blocking apparatus configuration, wherein each door blocking apparatus configuration is adapted to manage and control the corresponding door blocking apparatus via the corresponding network connection available to a user from and for use with or within the networked system.

The related art includes, for instance, online security platforms that offer remote monitoring, remote locking and unlocking of doors, or for a combination thereof. Prior art security platforms offer remote and in-person electronic status indications, remote and in-person electronic activations and deactivations of locks, and manual, in-person key-based or code-based activations and deactivations of locks.

As described below, embodiments of the present invention include the use of novel features of a stand-alone door blocking mechanism in a door blocking apparatus, and additional features when combining a door blocking apparatus within an online or networked platform comprising a networked system involving at least one network connection, at least one door blocking apparatus, at least one door blocking apparatus configuration, using systems and methods different from those of the prior art systems and methods.

BRIEF SUMMARY OF THE INVENTION

The invention relates to systems, methods, and apparatus involving preventing the opening of a door by unauthorized personnel, and reducing a likelihood that the door may be opened by unauthorized personnel.

According to a first aspect, the present disclosure provides a door blocking apparatus for a door-comprising: an apparatus handle located on a safety side of the door; and at least one blocking part coupled to the apparatus handle, the at least one blocking part attachable in a single location on a safety side surface adjacent a first side of a closed door, the at least one blocking part movable between a blocking position and a non-blocking position, the at least one blocking part substantially blocking the door from rotating from a closed position when the at least one blocking part is in the blocking position, and the at least one blocking part allowing the door to rotate freely when the at least one blocking part is in the non-blocking position.

According to a second aspect, the present disclosure provides a door blocking apparatus for a door comprising: an apparatus handle located on a safety side of the door; and at least one blocking part coupled to the apparatus handle, the at least one blocking part attachable in a single location on a safety side surface adjacent a first vertical side of a closed door, the first vertical side opposite a second vertical side, the second vertical side including at least one hinge of the door, the at least one blocking part movable between a blocking position and a non-blocking position, the at least one blocking part substantially blocking the door from rotating from a closed position when the at least one blocking part is in the blocking position, and the at least one blocking part allowing the door to rotate freely when the at least one blocking part is in the non-blocking position.

According to a third aspect, the present disclosure provides a method of retaining a door in a closed position comprising the steps of: placing the door in the closed position; rotating an apparatus handle to move at least one blocking part from an unblocking position to a blocking position, the apparatus handle located on a safety side of the door; and at least one blocking part coupled to the apparatus handle, the at least one blocking part attachable in a single location on a safety side surface adjacent a first side of a closed door, the at least one blocking part movable between the blocking position and the non-blocking position, the at least one blocking part substantially blocking the door from rotating from a closed position when the at least one blocking part is in the blocking position, and the at least one blocking part allowing the door to rotate freely when the at least one blocking part is in the non-blocking position.

Further aspects of the invention are set forth herein. The details of exemplary embodiments of the invention are set forth in the accompanying drawings and the description below. Other features, objects, and advantages of the invention will be apparent from the description and drawings, and from the claims.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, the embodiments shown in the drawings are presently preferred. It should be understood, however, that the invention is not limited to the precise arrangements and instrumentalities shown. By reference to the appended drawings, which illustrate exemplary embodiments of this invention, the detailed description provided below explains in detail various features, advantages, and aspects of this invention. As such, features of this invention can be more clearly understood from the following detailed description considered in conjunction with the following drawings, in which the same reference numerals denote the same, similar, or comparable elements throughout. The exemplary embodiments illustrated in the drawings are not necessarily to scale or to shape and are not to be considered limiting of its scope, for the invention may admit to other equally effective embodiments having differing combinations of features, as set forth in the accompanying claims.

In FIG. 3A, the door blocking mechanism is in a blocking position, in which blocking parts extend beyond the door frame to overlap the door jamb.

FIG. 3B depicts the door blocking mechanism in a non-blocking position, with the apparatus handle in a vertical position and pointing upward, wherein the blocking parts are contained within a door frame cover and do not overlap or block the doorjamb, and therefore do not physically interfere with, and prevent, a door from opening and closing within the door jamb.

In FIG. 5, the door blocking mechanism is in a blocking position, in which blocking parts extend beyond the door frame to overlap the door jamb. If the door were depicted as closed against the door jamb of the door frame, the blocking parts of the door blocking mechanism in the blocking position would physically prevent the door within the door jamb from opening.

DETAILED DESCRIPTION OF THE INVENTION

Figure 1A:
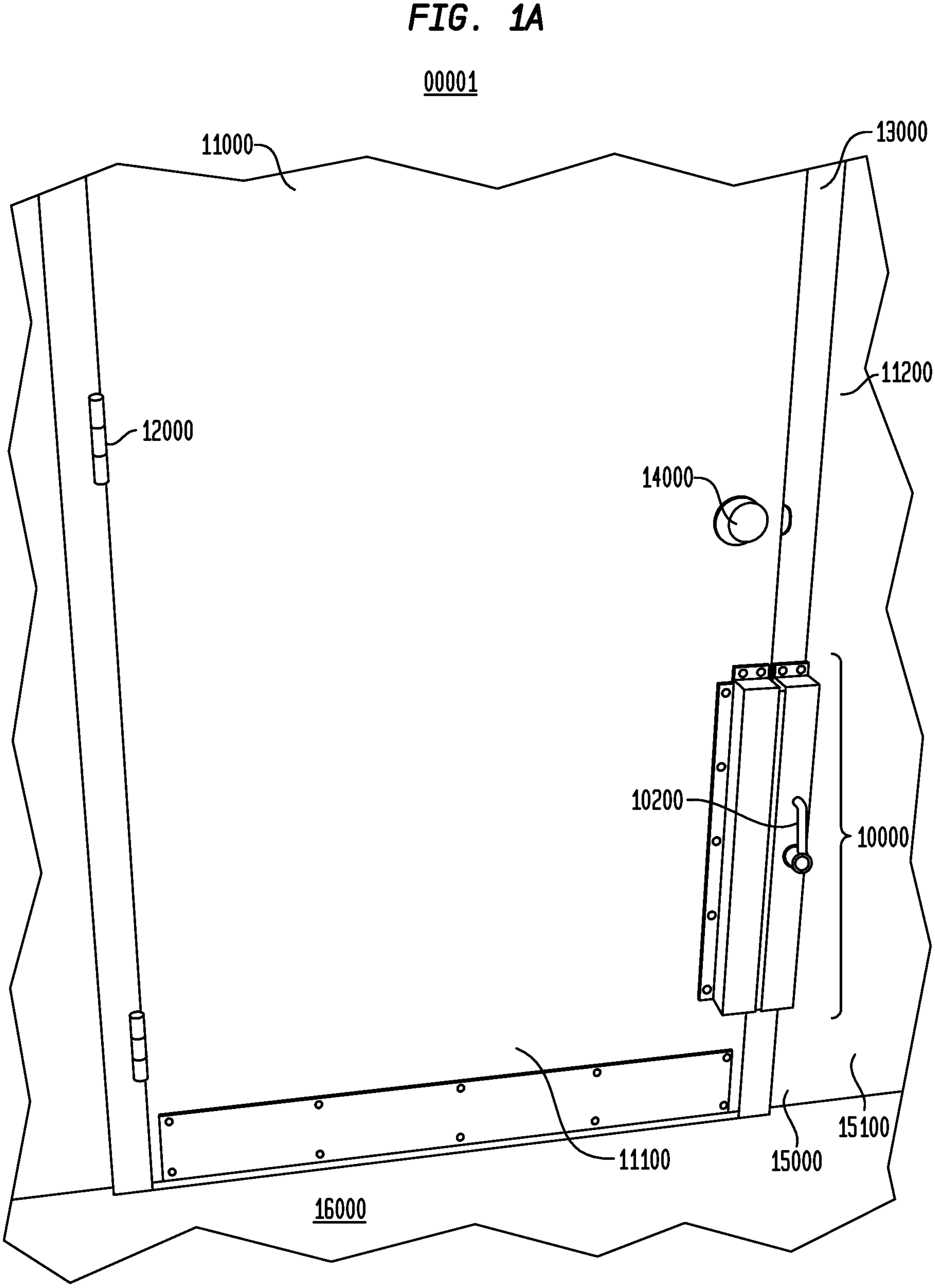
FIG. 1A depicts a perspective view of a safety side of door location having a door closed in a door frame bounded by a wall and a floor, in which the door location has a door blocking apparatus in an unlocked, non-blocking position, in which an apparatus handle of the door blocking apparatus is located in a substantially upright, vertical position in accordance with one embodiment of the present invention.

The invention is directed to systems, methods, and apparatus involving a door blocking apparatus adapted to prevent and/or reduce a likelihood of, opening of a door by unauthorized personnel. The apparatus possibly may be networked in communication with a networked security system and/or an online security platform, and possibly operable as a configurable apparatus having electronics, such as a keypad, buttons, a camera, a microphone, a speaker, and a transceiver, coupled to and controlled by a processor, with the apparatus adapted to be connectable to the networked system and/or online security platform, and preferably connected to the system and platform, in a networked environment.

A networked security platform may include one or more networked security systems. A networked system may have one or more networked door blocking apparatus. Each door blocking apparatus in a networked system may have a network connection and an associated door blocking apparatus configuration. Each configuration may include, for instance, a location, a map, a door status, a door blocking apparatus status, a network status, a system status, a scheduled plan, a contingency plan, an access log, an authorization roster, and combinations thereof. A user of the online security platform may be, for example, a facility administrator, a staff member, a security personnel, a first responder, a maintenance worker, a vendor, or combination thereof. A user may create and/or distribute a door blocking apparatus configuration, a system configuration, or both, by using the online platform for user-based creation and/or distribution of apparatus and system configurations. Each configuration may be software code in a configuration file that includes, for instance, one or more of a settings file, a configuration file, a profile file, an applet file, an application file, a plug-in file, an application protocol interface ("API") file, an executable file, a library file, an image file, a video file, a text file, a database file, a metadata file, and a message file.

In accordance with a first aspect of the invention, a door blocking apparatus is disclosed comprising a door blocking mechanism that is adapted to allow a user to reduce and/or prevent a likelihood that a door may be opened by unauthorized personnel. The apparatus may be networked within a network security system, and the system may be part of a networked platform. The user may configure a configurable configuration through creation, editing, and/or installation of a configuration file within a software application within the system adapted to monitor and control the configurable door blocking apparatus and the apparatus configuration, wherein the apparatus has electronics including hardware, such as a processor, memory, input means (e.g., a button, a keyboard, a touchpad, a joystick, a photosensor, a motion sensor, a camera, a microphone, a communication module, a data transfer device, etc.), output means (e.g., a light, a display, a speaker, a vibrator, etc.), and related software. Said electronics are adapted to execute the apparatus-local software, install the configuration file, and configure the configurable apparatus and apparatus configuration.

In an exemplary embodiment, the apparatus has networking capabilities and access to a networked system and/or an online platform, from which the apparatus may download an apparatus configuration, and possibly access to a networked security system when a network connection exists. More specifically, an apparatus adapted for preventing, and/or reducing a likelihood of, opening a door by unauthorized personnel may comprise a door blocking mechanism, having an exterior housing defining an interior compartment containing electronic circuitry; and a data transfer device adapted to interoperate with the electronic circuitry. The electronic circuitry may include an integrated electronic hardware system and an integrated software operating system stored and executable on the integrated electronic hardware system. The integrated electronic hardware system may include, for instance, an integrated camera, an integrated microphone, and an integrated speaker coupled to an internal processor coupled to an internal memory, an internal power source, an integrated data transfer module interoperable with the data transfer device, and at least one integrated input button operable from without the exterior housing. The software and the hardware may be adapted to enable a power user to set up the apparatus and/or system, for example, to create in the software and store in the memory a first profile identifying a first participant; to download a configuration from an online platform; to select a configuration for use with a system and/or an apparatus; and to operate an apparatus using an apparatus configuration.

The data transfer device may be adapted to enable a data transfer between the apparatus and a separate computing device, wherein the data transfer device may be adapted to enable the apparatus to communicate with and transfer electronic data to the separate computing device and to enable the separate computing device to communicate with and transfer electronic data to the apparatus. The data transfer device may include, for example, a wire cable, a wireless transceiver, or both. The apparatus may be enabled to transfer to the separate computing device security software and a configuration file, and the separate computing device may be enabled to transfer to the apparatus security software and a configuration file. The wire cable also may be adapted to enable the apparatus to recharge the internal power source when the wire cable is coupled to an external power source.

In accordance with a second aspect of the invention, a system is disclosed that includes, for instance, a networked door blocking apparatus within a networked security system, which further may comprise an online security platform; wherein each apparatus configuration of a plurality of apparatus configurations is available from a separate computing device for use with or within the system and/or platform; and wherein each configurable apparatus is one of the plurality of apparatus available within the system.

In an exemplary embodiment of the system, each user of the networked system and/or online platform may be a facilities administrator, a security staff member, a maintenance staff member, an IT administrator, etc. A user may create and/or distribute an apparatus configuration, a system configuration, or both, by using the networked system and/or online platform for user-based creation and/or distribution of configurations. Each configuration may be software code in a configuration file that includes, for instance, one or more of a settings file, a configuration file, a profile file, an applet file, an application file, a plug-in file, an application protocol interface ("API") file, an executable file, a library file, an image file, a video file, a text file, a database file, a metadata file, and a message file. A user may develop the software code for the configuration file using, for instance, programming in coding languages, such as JavaScript and HTML, including open source code, or object-oriented code assembly. The software code would be adapted to be compatible with and executable by the software of a system or apparatus on which a compatible program may be executed, with which or within which the configuration would be used.

In an exemplary embodiment, the system may include one or more apparatus of the first aspect of the invention, in which each apparatus is adapted and configured to interact with and/or within the system, and possibly with and/or within an online security platform. In some embodiments, the system may include a security platform, in which the apparatus is adapted and configured to interact with the security platform. The apparatus may include, for instance, a door blocking mechanism, a network connection, and a local computer allowing execution of apparatus software, such as for communication with system software and/or platform software, which may allow use of a configuration from a software application within the system or platform. In some embodiments, the system may be adapted to enable, permit, and allow a user to unblock and open, and/or close and block, a door blocking mechanism, using an apparatus configuration with or within the system and/or platform. The system further may be adapted to enable, permit, and allow a plurality of users to operate a plurality of door blocking apparatus, such as within a single facility, across multiple facilities, a single system, a plurality of systems, or a combination thereof.

In accordance with a third aspect of the invention, a method for preventing, and/or reducing a likelihood of, an opening of a door by unauthorized personnel is disclosed, in which the method includes providing and activating a door blocking apparatus, as described herein. The method further may comprise providing a networked security system and/or providing an online security platform, and connecting the door blocking apparatus with system and/or platform; adapting the system or platform to accommodate and manage a plurality of apparatus and a plurality of users; and adapting the system or platform to manage a plurality of apparatus configurations. In some embodiments, the online security platform further may be adapted in accordance with the second aspect of the invention.

In an exemplary embodiment, the method further may be adapted for interaction with a participant, in which the method comprises providing an apparatus adapted for interaction with the participant, in which the apparatus may be configured in accordance with the first aspect of the invention; configuring the apparatus to interact within the system; configuring the apparatus to interact with the participant; enabling the apparatus to interact with the participant; and adapting the apparatus to electronically process apparatus data, configuration data, audio data, video data, or a combination thereof, of an interaction of the apparatus with the participant. The method may further comprise providing a security platform and adapting and configuring the apparatus to interact with the security platform.

An exemplary embodiment of the invention is being brought to the market under the trademark "IDS Guardian" by Securit-C, LLC. When paired with an electric latching and/or locking mechanism, such as an electric strike, magnetic lock, etc., and installed as designed, the IDS Guardian secondary barrier device is a unit that complies with the standards and requirements of IBC chapter 10, IFC chapter 10 and NFPA 101 CH 14 and CH 15. Utilizing custom circuit boards, once engaged, an IDS Guardian door blocking apparatus is capable of, for instance, activating the door blocking mechanism, triggering a silent alarm, and sending out a direct notification via text, email, or telephone to anyone on a programmable call list. Utilizing a Knox® box located on the structure, a unique key device is stored inside and available for emergency personnel to disengage the IDS Guardian door blocking apparatus from the ingress side of the door. Once the unit is disengaged from either side, a time delay relay may release the electric latching and/or locking mechanism for a programmable period of time, typically thirty (30) seconds, creating one motion of operation to access a room that has been locked down.

In a security system having a plurality of networked door blocking apparatus, such as in a commercial facility, each apparatus may have a circuit board that is daisy-chained to a 'motherboard' circuit board of a locally networked system, or the motherboard may be daisy-chained to each of the boards of the apparatus. In a networked system, each apparatus circuit board may include a communication module to communicate (i.e., exchange data) with the motherboard, and the motherboard may be connected to the Internet through a communication module and may communicate (i.e., exchange data) to an online security platform. Embodiments designed for use in residential buildings (e.g., single-family homes) may resemble embodiments designed for use in commercial buildings, with some modifications made to suit the nature, expectations, and typical budget of a residential system. For instance, whereas an embodiment designed for a commercial building may include a hardwired networked computer system having larger, thicker-metal apparatus bolted into metal doorframes of metal security doors, an embodiment designed for a residential building may include an ad-hoc wireless networked system having smaller, thinner-metal apparatus screwed into wood doorframes of entry/exit doors, with each residential apparatus communicating wirelessly with a general purpose wireless WiFi router.

In some embodiments, a circuit board of a door blocking apparatus for a commercial building may have limited computing capabilities (e.g., door status, lock status, lock/unlock controls), because more sophisticated computing capabilities reside in a more sophisticated general processor or central processing unit (CPU) of a central security system. Conversely, in some embodiments, each door blocking apparatus for a residential building may have its own processor or CPU in order to perform a wide range of computing capabilities, such as communicate with a WiFi router, if the residential system lacks a central control computer. In some embodiments, designed for either commercial or residential contexts, an apparatus may include a keypad, buttons, a camera, a microphone, and a speaker, for example, to enable bidirectional communication, observation, and surveillance in the vicinity of the door, possibly on either or both sides of the door, allowing a remote user to see both the room and people protected by a door blocking apparatus, as well as the possible aggressors in the space in front of the blocked-out side of door. An alternative residential embodiment may omit computer control and connectivity entirely and operate as a stand-alone door blocking apparatus, in a manner akin to a conventional deadbolt lock.

As depicted in the drawings described herein, a door blocking apparatus preferably is installed vertically on a lower portion of a door jamb opposite a plurality of hinges of a swing-style door. Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a fastener" may include a plurality of fasteners. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs, and materials are now described. All publications mentioned herein are incorporated herein by reference in their entirety. Where there are discrepancies in terms and definitions used in references that are incorporated by reference, the terms used in this application shall have the definitions given herein.

Figure 7:
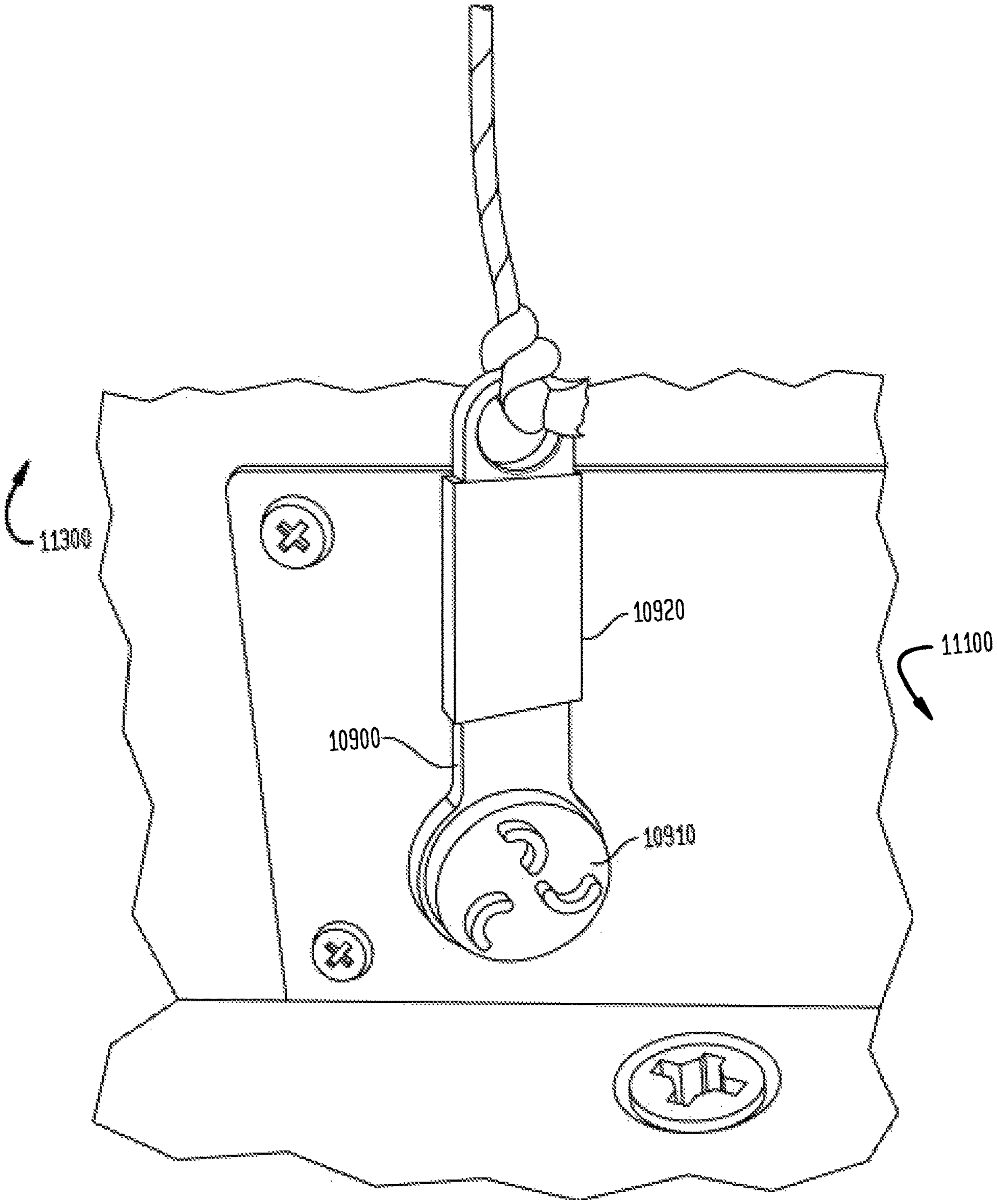
FIG. 7 depicts an exemplary lock key for use with the door blocking apparatus shown in FIG. 1A through FIG. 6B.

The goal of the door blocking mechanism of the present invention is to prevent a door or other swinging object from being opened even when it is in a locked state (e.g., via kicking in the door and breaking the door's internal lock) by activating a physical blocker that prevents the door from opening. In some aspects, the blocker is indexed from an unblocking state to a blocking state via turning of a handle approximately ninety (90) degrees, however, the invention is not so limited. In some aspects, the door blocking mechanism may be utilized in a building to lock down rooms in the event of an active shooter situation, however, the invention is not so limited. In some aspects, the block device is manually activated to a blocking position from a first side of the door and it may be removed from the blocking position and returned to a position in which it does not impede movement of the door via the use of a unique key, intended for use by Emergency Professionals. In some embodiments, the key is comprised of a series of "C" shaped holes unique to the invention as shown in FIG. 7. This key allows first responders and emergency personnel to easily unblock doors and enter areas to which they require access after the safety threat that required the blocking of the door is removed. This arrangement is in sharp contrast to current measures, in which the blocking of a door may physically damage the door, thereby not allowing it to be reopened, or in which the people on the blocked side of the door are unable to remove the blocking mechanism for anyone of a variety of reasons. In some aspects of the invention, an electrical contact is included that can alarm a remote system when a change in the blocker's position occurs due to, for example, turning of the blocking mechanism handle.

The systems and methods of the present invention are unique for multiple reasons including, without limitation: 1) the blocking mechanism has a higher strength than existing door blocking mechanisms; 2) the blocking mechanism has the ability to be unblocked from the side of the door opposite the blocker; and 3) the unique design of the key with the three "C"s provides a key that is very difficult to duplicate as well as a mating keyhole that cannot be easily unlocked with devices other than the corresponding key (e.g., a screwdriver or the like).

In some embodiments of the present invention, a system is provided that comprises an online security platform that connects the security system and users in a networked environment. The online security platform and networked system may provide users features such as to share, save, alert, and configure activities of the door blocking apparatus, including managing apparatus configurations for use with configurable apparatus and systems. The platform and system may provide a dashboard of, for instance, user activity, door activity, and door status data.

In an exemplary embodiment of the invention, the apparatus embodies a door blocking apparatus having a door blocking mechanism and electronic circuitry to monitor and control the door blocking mechanism. The door blocking apparatus may include an internal chargeable battery so that it may operate wirelessly and absent a wired power connection, such as where none exists, or where a wired power connection fails (e.g., a power outage) or is disconnected (e.g., during a burglary). With a subscription to an online security platform, users can manage, monitor, and configure connected systems, apparatus, and apparatus configurations. The users may share their activities on the security system or platform with other users and by other electronic means. For instances, a user might create video surveillance compilations of video recordings made using cameras integrated in correspondingly-configured apparatus, and share such compilations with other users, or third parties, such as the police. In some embodiments, apparatus configurations and data collections may be educational in nature and function as learning tools to develop, practice, improve, or reinforce a user's security practices or knowledge of specific information or content, such as timings, locations, and volumes of flows of foot traffic through various doors.

Numerous possible embodiments of the platform and system are envisioned. Exemplary users may include, for instance, security personnel, facility maintenance staff, IT programmers, police, teachers, schools, educators, and administrators of a commercial or educational building; whereas a residential context may include adults, children, parents, family, relatives, and friends. For example, the apparatus may include a door blocking mechanism housing a computing device that is operable to open/unblock and close/block the mechanism when activated by the user. The device may include a rechargeable battery for ease of use. The device may connect to the networked security system or online platform via the Internet and may download or upload security software updates and apparatus configurations, and other data or files to one of any number of online destinations, such as a website, a cloud service, a mobile app, and combinations thereof. The device may connect to a security platform, which may include a membership or subscription option for members to obtain additional benefits. A membership option may include enabling access to the video recordings made by an apparatus, enabling access to groups specific to the user, and enabling access to other content specific to the apparatus. The online security platform may provide the membership option, may provide its own communication platform, and may connect to a third-party social media platform, service, or system, in which users of the platform may communicate and/or share data with each other.

Referring to the Figures, a door blocking apparatus may include a computing device operable as a control console, may be connectable to a networked system and/or an online platform via a networked environment, and may comprise part of a security platform or system, which may include a data system, including at least one server and at least one database, and a network system, including computing devices in communication with each other via network connections.

Referring to FIG. 1A, FIG. 1A depicts a perspective view of a safety side of door location having a door closed in a door frame bounded by a wall and a floor, in which the door location has a door blocking apparatus in an unlocked non-blocking position, in which an apparatus handle of the door blocking apparatus is located in a substantially upright, vertical position in accordance with one embodiment of the present invention.

The door location 00001 includes a door blocking apparatus 10000 installed at the door location 00001 and adapted to operate with a door 11000. The door 11000 is being held by and opens by operation of at least one door hinge 12000 connecting the door 11000 to a door frame 13000, and the door 11000 is operable by a door handle 14000. The door blocking apparatus 10000 preferably is installed on the side of the door frame 13000 opposite the door hinges 12000. In door location 00001, the door frame 13000 is built into a wall 15000, and the door location 00001 is bounded by the wall 15000 and an adjacent floor 16000. The door 11000 is located on a door side 11100 within the door frame 13000, while the wall 15000 surrounds the door frame 13000 on a wall side 15100 of the door frame 13000.

The door 11000 is depicted as a swing door that separates two opposing sides of the door 11000, in which the door 11000 may be swung open into a first side, referred to as a safety side 11200, permitting access to and from the first side, from and to a second side, referred to as a threat side 11300, on the opposite side of the door 11000. FIG. 1A depicts the safety side 11200 of the door 11000, which is a side of the door 11000 into which the door 11000 opens, onto which the door blocking apparatus 10000 would have an apparatus cover 10100 and a hand-operable apparatus handle 10200 for hand-operation of the door blocking apparatus 10000, and to which persons presumably would retreat to find safety, in the event that a threat presents itself on the threat side 11300.

Figure 1B:
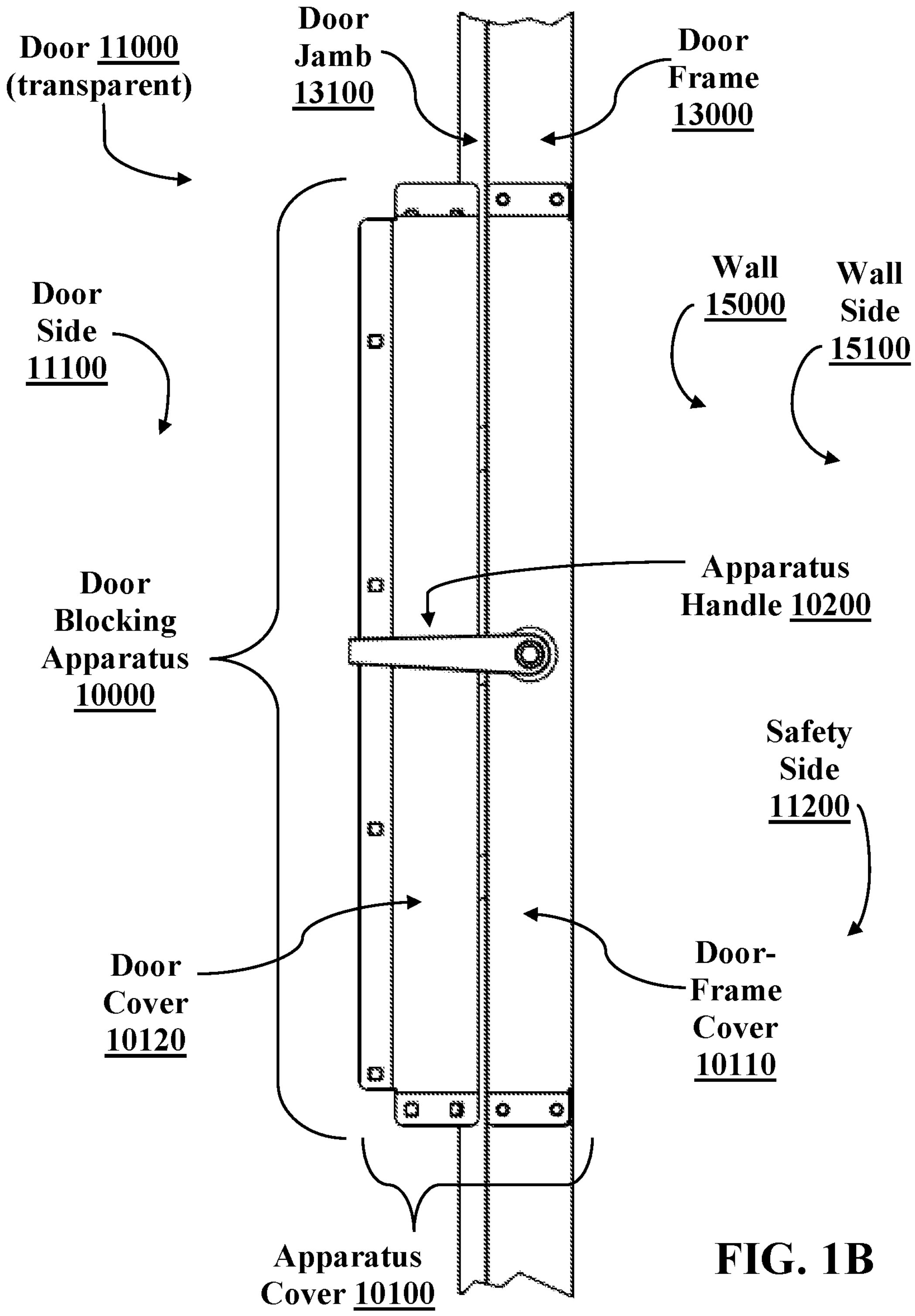
FIG. 1B depicts a front elevation partial view of a safety side of a door blocking apparatus installed on a door and door frame, in which the door blocking apparatus is in a blocking position, in which an apparatus handle of the door blocking apparatus is located in a substantially horizontal position, in accordance with one embodiment of the present invention.

Referring to FIG. 1B, FIG. 1B depicts a front elevation partial view of a safety side 11200 of a door blocking apparatus 10000 installed on a door 11000 and door frame 13000, in which the door blocking apparatus 10000 is in a blocking position, in which an apparatus handle 10200 of the door blocking apparatus 10000 is located in a substantially horizontal position in accordance with one embodiment of the present invention. In FIG. 1B, the apparatus handle 10200 is depicted after having been rotated down toward the door from a vertical position in FIG. 1A. Although the exemplary embodiments depict the apparatus handle 10200 as rotatable, other embodiments might have the apparatus handle 10200 slide horizontally or vertically to move between the non-blocking position and the blocking position. FIG. 1B depicts the door 11000 as transparent, and as closed, such that a door jamb 13100 of the door frame 13000 is depicted as visible behind the apparatus cover 10100, which includes a door-frame cover 10110 attached to the door frame 13000, and a door cover 10120, attached to the door 11000. Viewed from the safety side 11200 of a door 11000 in a closed position, three main components of the door blocking apparatus 10000 are visible, which include the door-frame cover 10110, the door cover 10120, and the apparatus handle 10200.

Figure 2:
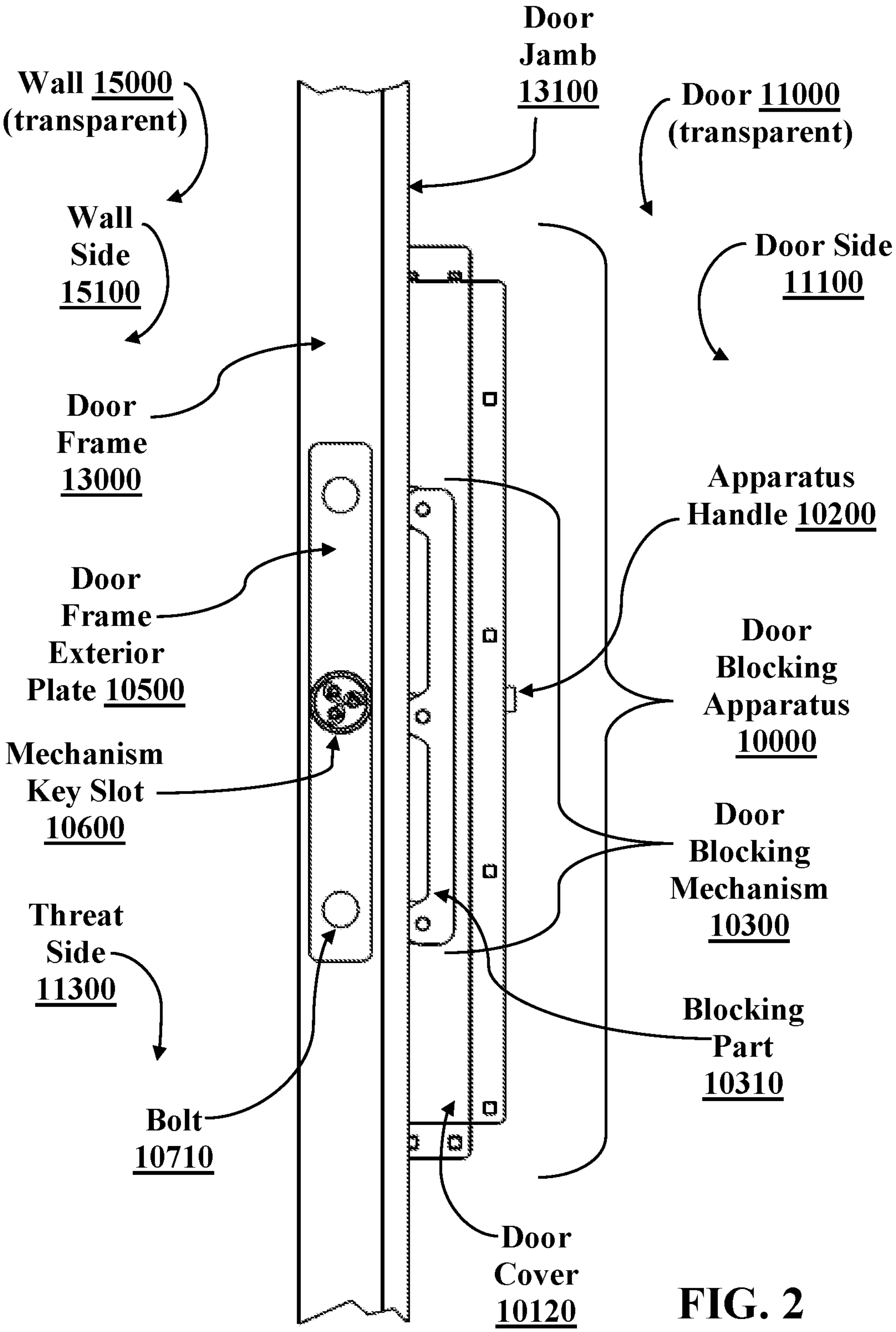
FIG. 2 depicts a front elevation partial view of a threat side of a door blocking apparatus installed on a door frame and a transparent door, in which the door blocking apparatus includes a door blocking mechanism in a blocking position extending from the door frame and over the door, in which an apparatus handle of the door blocking apparatus is located in a substantially horizontal position, and in which the door blocking apparatus includes on the threat side of the door frame a mechanism key slot for unblocking the door blocking mechanism. Inasmuch as the door is depicted as being transparent, FIG. 2 also depicts a rear elevation partial view of the door blocking mechanism and a door cover attached to the door, wherein the door blocking mechanism extends into the door cover when in the blocking position, in accordance with one embodiment of the present invention.

Referring to FIG. 2, FIG. 2 depicts a front elevation partial view of a threat side 11300 of a door blocking apparatus 10000 installed on a door frame 13000 and a transparent door 11000. In FIG. 2, the door blocking apparatus 10000 includes a door blocking mechanism 10300 depicted in a blocking position extending from the door frame 13000 and over the door 11000, in which an apparatus handle 10200 of the door blocking apparatus 10000 is located in a substantially horizontal position. FIG. 2 depicts the door blocking apparatus 10000 as including on the threat side 11300 of the door frame 13000 a door frame exterior plate 10500 and a mechanism key slot 10600 for unblocking the door blocking mechanism 10300. The exterior plate 10500 and the key slot 10600 are secured to the door frame 13000 using fasteners 10700, such as bolts 10710.

Inasmuch as the door 11000 is depicted as being transparent, FIG. 2 also depicts a rear elevation partial view of the door blocking mechanism 10300 and a door cover 10120 attached to the door 11000, wherein the door blocking mechanism 10300 extends into the door cover 10120 when in the blocking position, in accordance with one embodiment of the present invention.

Figure 3A:
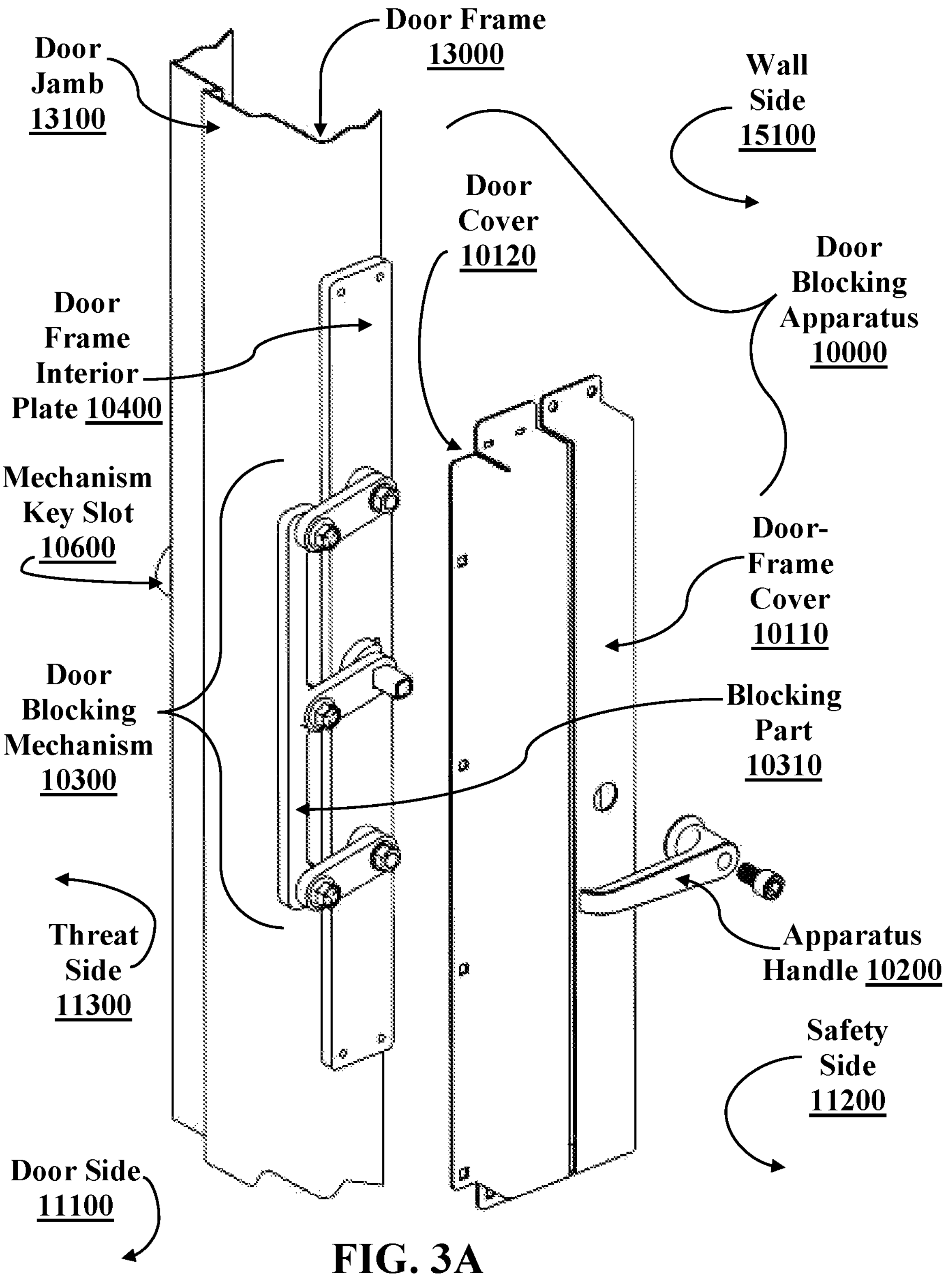
FIG. 3A depicts a partially-exploded front perspective partial view, from the safety side, of the door blocking apparatus depicted in FIG. 2, in which the door and the wall are not depicted.

Referring to FIG. 3A, FIG. 3A depicts a partially-exploded front perspective partial view, from the safety side 11200, of the door blocking apparatus 10000 depicted in FIG. 2, in which the door 11000 and the wall 15000 are not depicted. In FIG. 3A, the door blocking mechanism 10300 is in a blocking position, in which blocking parts 10310 extend beyond the door frame 13000 to overlap the door jamb 13100. If the door 11000 were depicted as closed against the door jamb 13100 of the door frame 13000, the blocking parts 10310 of the door blocking mechanism 10300 in the blocking position would physically prevent the door 11000 within the door jamb 13100 from opening. FIG. 3A depicts that the door blocking mechanism 10300 is secured to the door frame 13000 using a door frame interior plate 10400 on the safety side 11200, and a door frame exterior plate 10500 on the threat side 11300, as shown in FIG. 2. The door frame exterior plate 10500 encases the key slot 10600 and is secured to the door frame 13000 using fasteners 10700, such as bolts 10710.

Figure 3B:
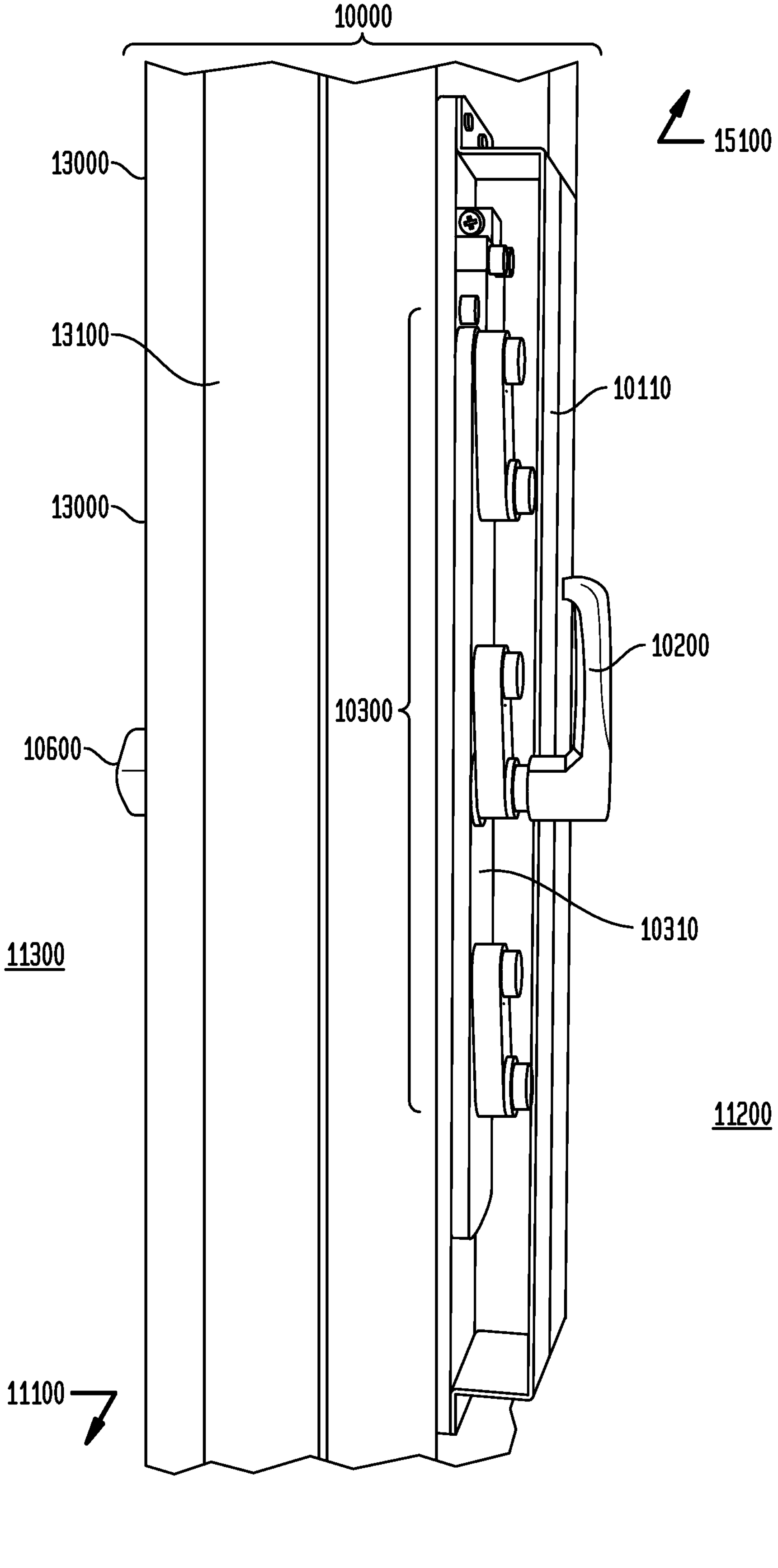
FIG. 3B depicts a side elevation partial view of a door location having a door frame and a door blocking apparatus, depicting the components of the door blocking apparatus attached to the door frame, and not depicting a door as closed against a door jamb of the door frame.

Referring to FIG. 3B, FIG. 3B depicts a side elevation partial view of a door location 00001 having a door frame 13000 and parts of a door blocking apparatus 10000, depicting the components of the door blocking apparatus 10000 attached to the door frame 13000, and not depicting a door 11000 as closed against a door jamb 13100 of the door frame 13000. FIG. 3B depicts the door blocking mechanism 10300 in a non-blocking position, with the apparatus handle 10200 in a vertical position and pointing upward. As depicted in FIG. 3B, when the door blocking mechanism 10300 is in a non-blocking position, the blocking parts 10310 have been shifted upward, are contained within a door frame cover 10110, and do not overlap or block the door jamb 13100, and therefore do not physically interfere with, and prevent, a door 11000 from opening and closing within the door jamb 13100.

Figure 4A:
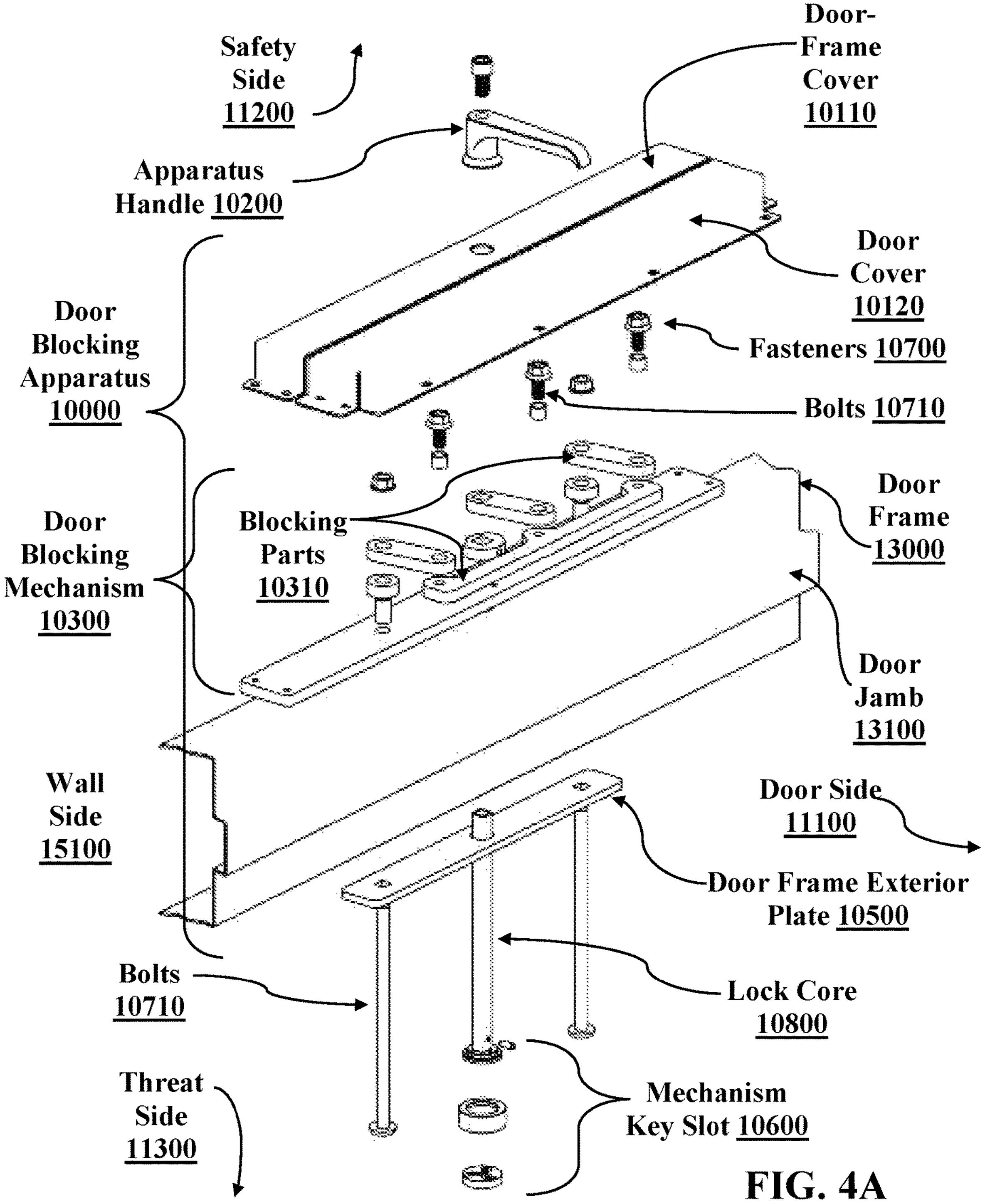
FIG. 4A and FIG. 4B depict exploded perspective partial views of the door blocking apparatus and corresponding portion of a door frame, depicted in FIG. 1B, FIG. 2, and FIG. 3A, with the views taken from different perspectives in accordance with one embodiment of the present invention.
Figure 4B:
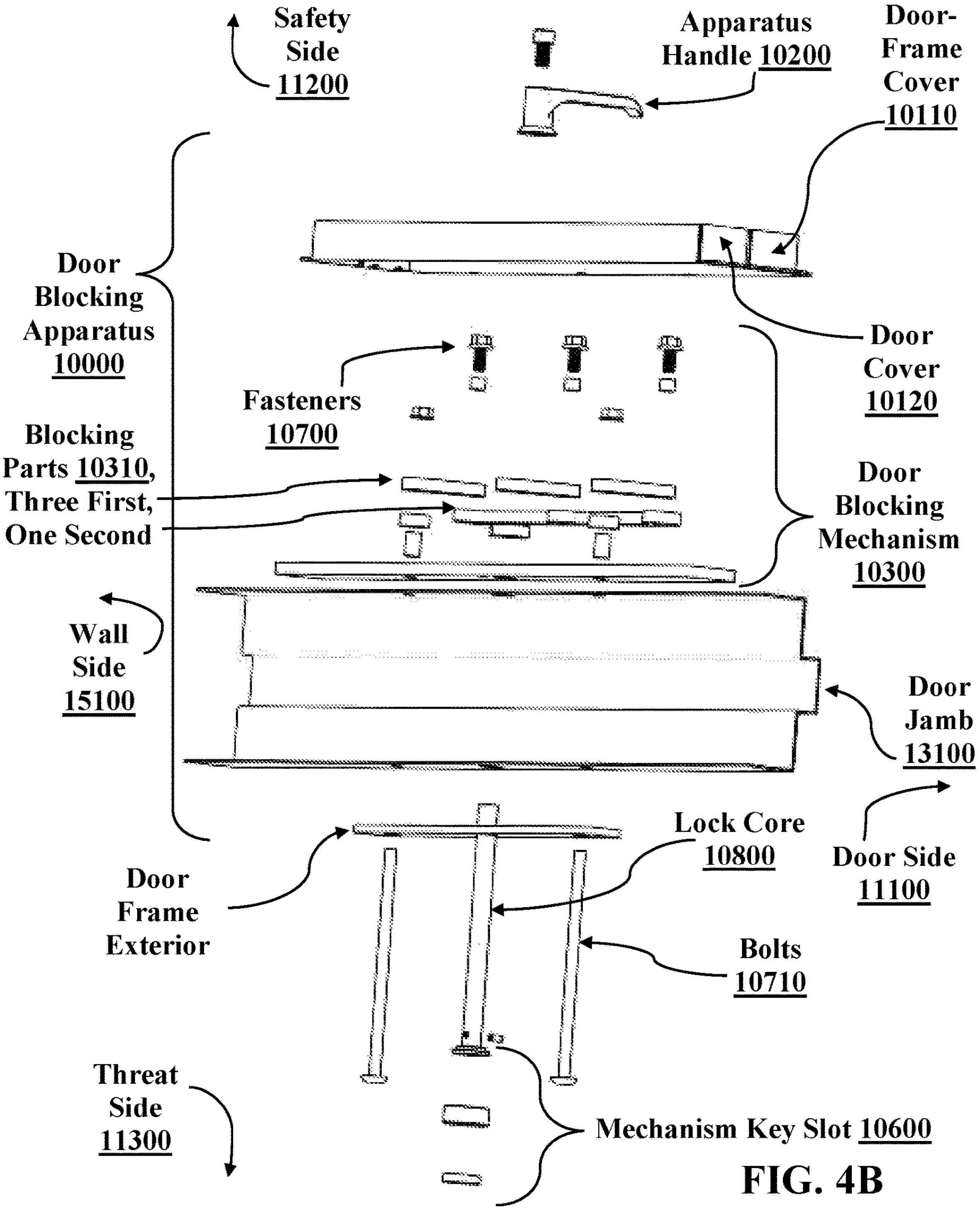

Referring to FIG. 4A and FIG. 4B, FIG. 4A and FIG. 4B depict exploded perspective partial views of the door blocking apparatus 10000 and corresponding portion of a door frame 13000, depicted in FIG. 1B, FIG. 2, and FIG. 3A, with the views taken from different perspectives in accordance with one embodiment of the present invention. The exploded views of FIG. 4A and FIG. 4B depict an attachment of the door blocking apparatus 10000 to the door frame 13000 using fasteners 10700, including bolts 10710, which may also be used in assembling and attaching the blocking parts 10310 of the door blocking mechanism 10300. In addition, the exploded views of FIG. 4A and FIG. 4B depict a lock core 10800 that traverses the door frame 13000 to connect the apparatus handle 10200, the door blocking mechanism 10300, and the mechanism key slot 10600. The lock core 10800 depicted in FIG. 4A and FIG. 4B is adapted to enable operation of the door blocking mechanism 10300 from the threat side 11300. Some embodiments may be adapted to allow a user on the threat side 11300 to both block and unblock the door 11000 using the door blocking apparatus 10000, using a lock key 10900 (see FIG. 7) adapted to fit the key slot 10600. The door blocking mechanism 10300 is depicted as a rotatable assembly of blocking parts 10310, and the blocking parts 10310 pivot about axes formed by their fasteners 10700, wherein a non-circular end of the lock core 10800 is adapted to cause the pivoting of the blocking parts 10310 and the rotation of their assembly, when the lock core 10800 itself is rotated by either the apparatus handle 10200 or a key 10900 in the key slot 10600.

Figure 5:
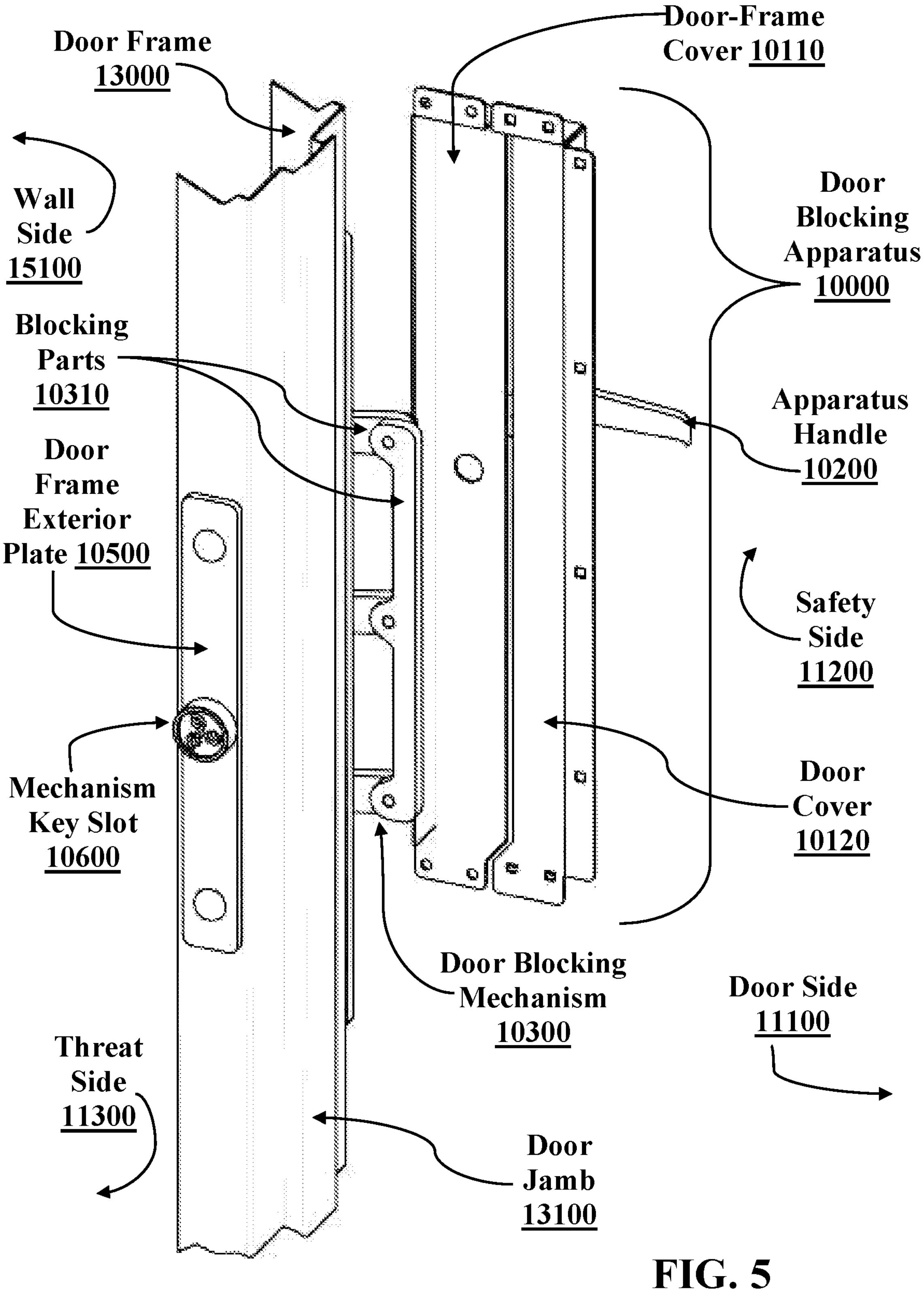
FIG. 5 depicts a partially-exploded front perspective partial view, from the threat side, of the door blocking apparatus depicted in FIG. 3A, in which the door and the wall are not depicted.

Referring to FIG. 5, FIG. 5 depicts a partially-exploded front perspective partial view, from the threat side 11300, of the door blocking apparatus 10000 depicted in FIG. 3A. The door 11000 and the wall 15000 are not depicted in FIG. 5. In FIG. 5, the door blocking mechanism 10300 is in a blocking position, in which blocking parts 10310 extend beyond the door frame 13000 to overlap the door jamb 13100. If the door 11000 were depicted as closed against the door jamb 13100 of the door frame 13000, the blocking parts 10310 of the door blocking mechanism 10300 in the blocking position would physically prevent the door 11000 within the door jamb 13100 from opening by swinging toward the safety side 11200.

Figure 6A:
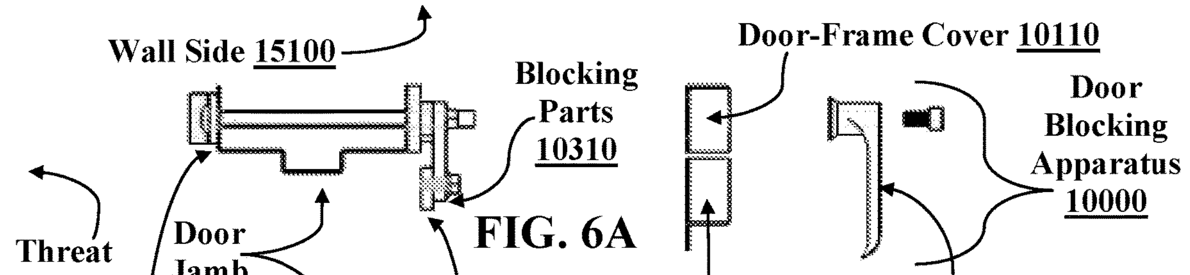
FIG. 6A depicts a partially-exploded top plan partial view of the door blocking apparatus and door frame, illustrating the door blocking mechanism and the blocking parts in a blocking position extending beyond the door frame and overlapping the door jamb.

Referring to FIG. 6A, FIG. 6A depicts a partially-exploded top plan partial view of the door blocking apparatus 10000 and door frame 13000, illustrating the door blocking mechanism 10300 and the blocking parts 10310 in a blocking position extending beyond the door frame 13000 and overlapping the door jamb 13100. Although FIG. 6A does not depict the door 11000, FIG. 6A depicts the door cover 10120 adjacent the door-frame cover 10110, as if the door cover 10120 were installed on a door 11000, and the door 11000 were in a closed position. FIG. 6A depicts the door blocking mechanism 10300 as including three first blocking parts 10310 adapted to be assembled to rotate around fasteners 10700 adapted to fasten the first blocking parts 10310 to a door frame interior plate 10400 (see FIG. 3A); and as including a second blocking part 10310 is adapted to be assembled to laterally interconnect the three first blocking parts 10310; in which the second blocking part 10310 is adapted to cause the three first blocking parts 10310 and the second blocking part 10310 to move in unison once assembled and upon operating the apparatus handle 10200.

Figure 6B:
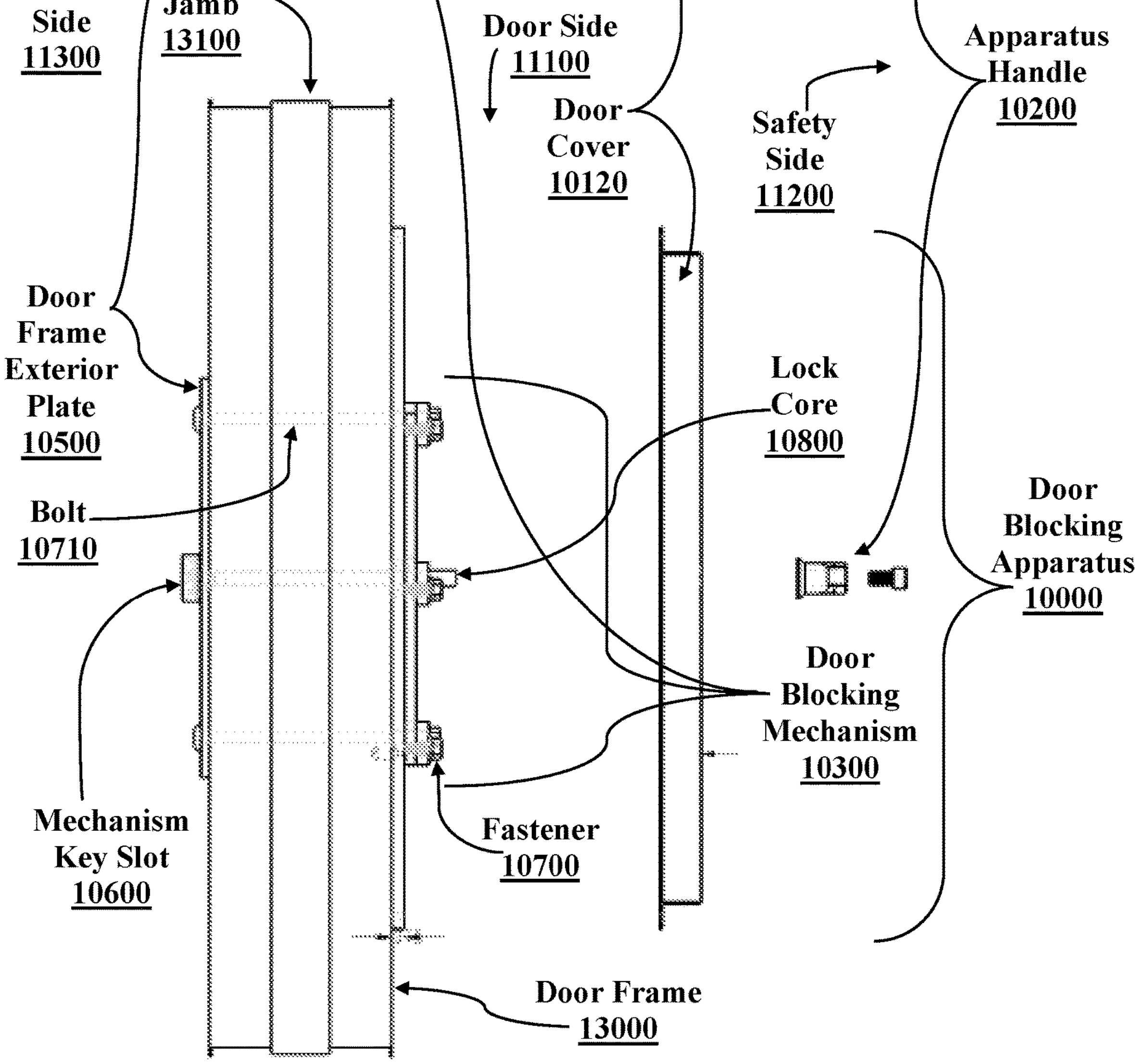
FIG. 6B depicts a partially-exploded side elevation partial view of the door blocking apparatus and door frame of FIG. 6A, illustrating in broken lines the fasteners and bolts of the door blocking apparatus that are concealed within and pass through the door frame.

Referring to FIG. 6B, FIG. 6B depicts a partially-exploded side elevation partial view of the door blocking apparatus 10000 and door frame 13000 of FIG. 6A, illustrating in broken lines the fasteners 10700 and bolts 10710 of the door blocking apparatus 10000 that are concealed within and pass through the door frame 13000.

Referring to FIG. 7, FIG. 7 depicts an exemplary lock key 10900 for use with the door blocking apparatus 10000 shown in FIG. 1A through FIG. 6B. The lock key 10900 preferably includes a key configuration 10910 that is difficult to replicate or forcibly operate, such as by a screwdriver, and yet provides sufficient grip to transfer enough torque from a handle 10920 of the lock key 10900 to operate the door blocking mechanism 10300 and rotate the blocking parts 10310. The key handle 10920 of the lock key 10900 functions in a manner similar to that of the apparatus handle 10200, when using the lock key 10900 in the key slot 10600 to operate the door blocking mechanism 10300, to transfer torque to the lock core 10800 to rotate the door blocking mechanism 10300. FIG. 7 depicts the key configuration 10910 as a concentric arrangement of three semicircular half-rings, resembling a "C," a rainbow, or a half-moon. The lock key 10900 has a key configuration 10910 that is mirrored on the key slot 10600, which is adapted to be difficult to duplicate, and is adapted to make the key slot 10600 difficult to operate without the lock key 10900. Security personnel, maintenance staff, and first responders (e.g., police, firefighters, EMTs) might have access to a lock key 10900 in a key lock box (e.g., Knox® box) associated with the door location 00001.

Figure 8:
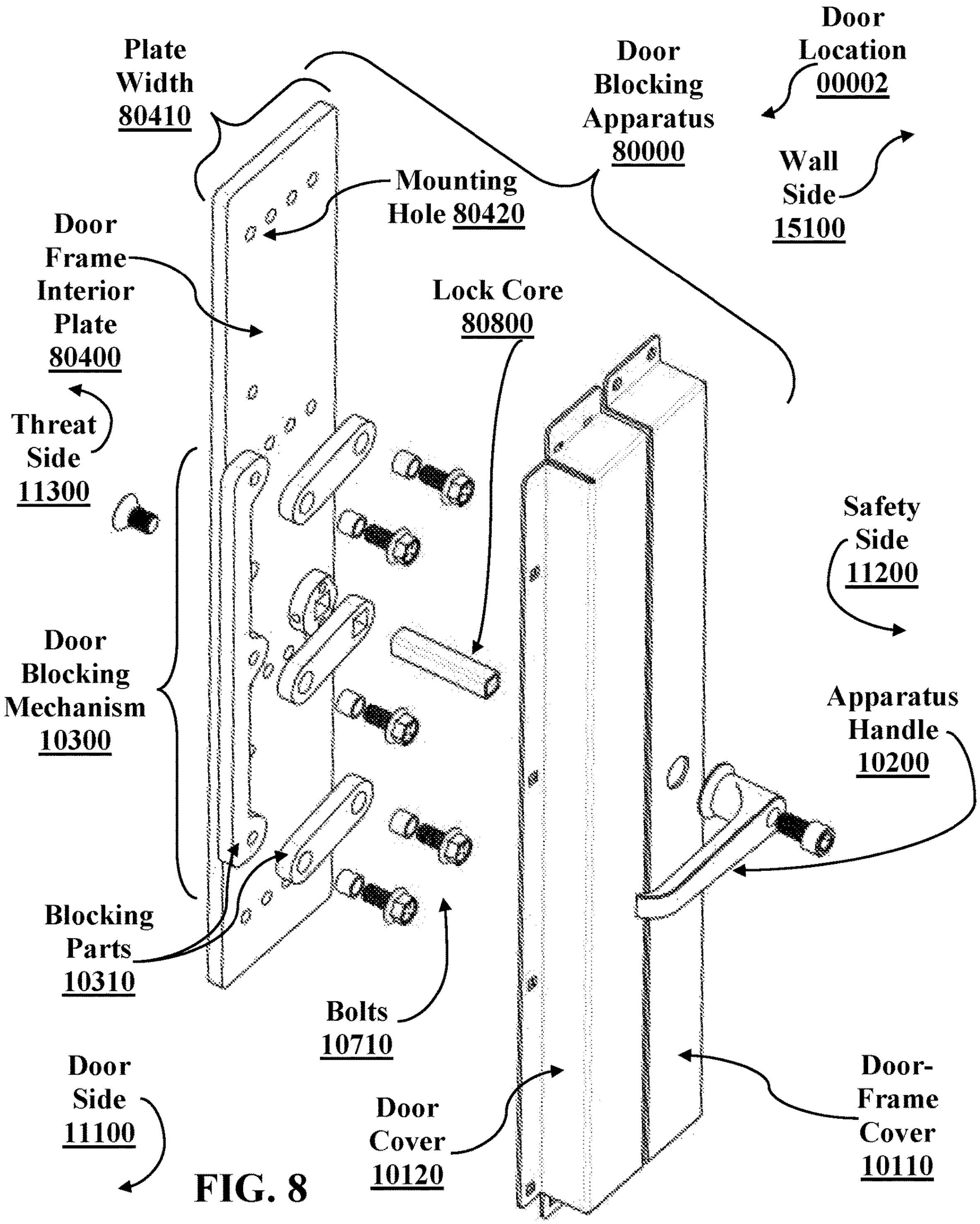
FIG. 8 depicts an exemplary door blocking apparatus that does not have components on the threat side of a door frame, and that does not have fasteners that pass through the door frame to the threat side of the door frame, in accordance with one embodiment of the present invention.

Referring to FIG. 8, FIG. 8 depicts a door location 00002 having an exemplary door blocking apparatus 80000 that does not have components on the threat side 11300 of a door frame 13000 (not shown), and that does not have fasteners 10700 that pass through the door frame 13000 to the threat side 11300 of the door frame 13000, in accordance with one embodiment of the present invention. A foreseeable implementation of such an embodiment might be an aftermarket installation at a residential home. This exemplary door blocking apparatus 80000 is designed to mount to structural framing surrounding a door 11000 that may not have a door frame 13000 adequate (e.g., not wide enough or not strong enough) to support the door blocking apparatus 80000.

The door blocking apparatus 80000 may include one or more components from apparatus 10000, such as the door blocking mechanism 10300, while other components may be modified for apparatus 80000. For instance, the door blocking apparatus 80000 may include a door frame interior plate 80400 having a plate width 80410 and a plurality of mounting holes 80420 that facilitate such a mounting, in which the wider plate width 80410 of the interior plate 80400 provides a wider area to accommodate installation of the door blocking mechanism 10300. The interior plate 80400 may be designed to mount to the door frame 13000 and the structural framing around the door frame 13000 surrounding the door 11000. The door-frame cover 10110 mounts to the interior plate 80400 to cover the door blocking mechanism 10300 (i.e., blocking parts 10310, fasteners 10700, and associated hardware) in its retracted state, and the door cover 10120 mounts to the door 11000 to cover the blocking parts 10310 when the door blocking mechanism 10300 is in the blocking position. Because the apparatus 80000 may not fully traverse the door frame 13000, a modified lock core 80800 may be used that is shorter than the lock core 10800 used in apparatus 10000.

Figure 9:
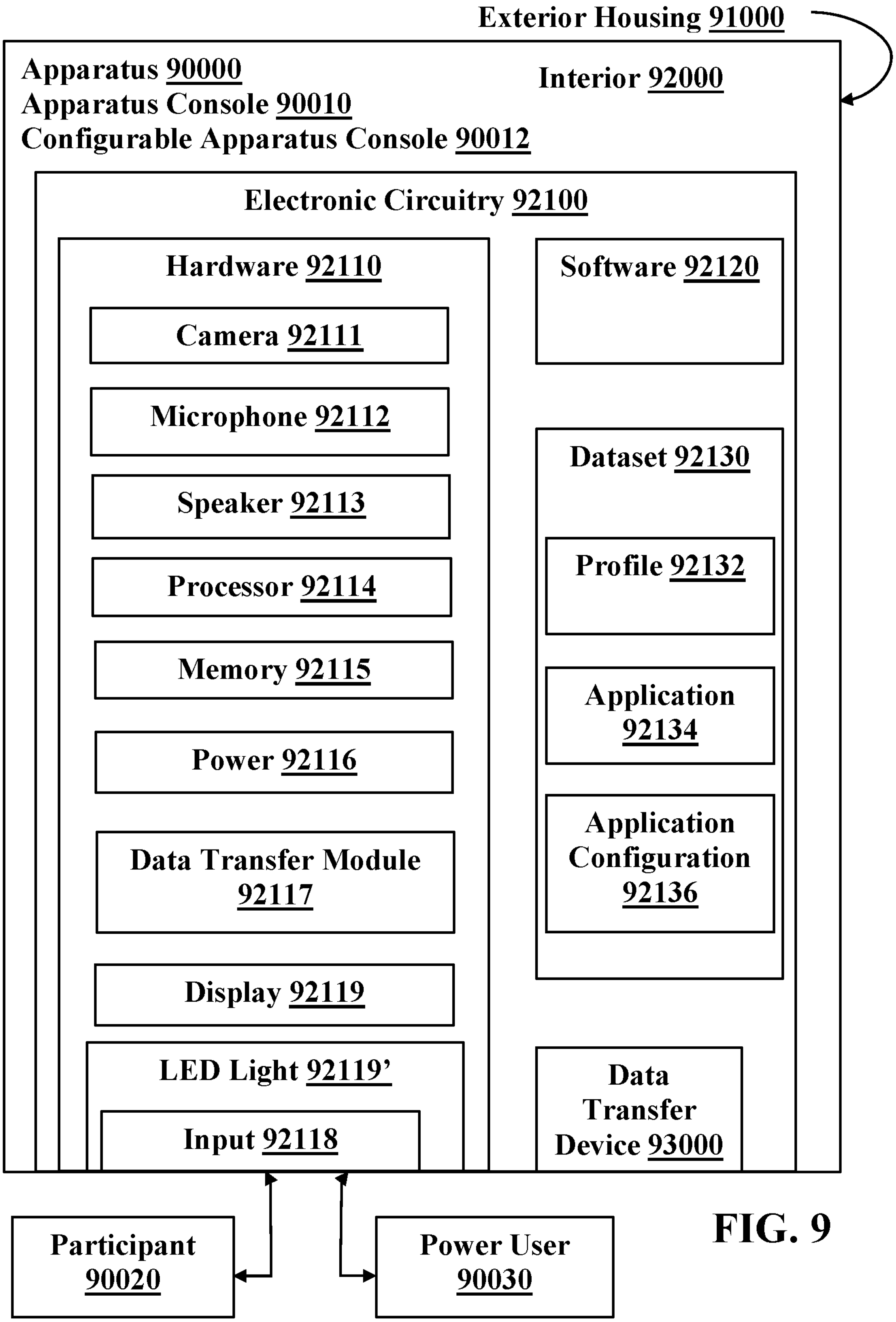
FIG. 9 shows a block diagram of an exemplary embodiment of an electronically-equipped door blocking apparatus, according to aspects of the invention.

Referring to FIG. 9, FIG. 9 shows a block diagram of an electronically-equipped door blocking apparatus 90000 adapted to operate as an apparatus console 90010, and more specifically a configurable apparatus console 90012 or other configurable device like a laptop computer. The apparatus 90000 may be configured for interactive communication adapted for the security of participants 90020. As explained below, the apparatus 90000 may be a part of a larger system, such as an online security platform and/or a security system. As depicted, the apparatus 90000 comprises an apparatus console 90010, having an exterior housing 91000, such as that of a configurable apparatus console 90012, and having an interior compartment 92000 containing electronic circuitry 92100. The apparatus 90000 includes a data transfer device 93000 adapted to interoperate with the electronic circuitry 92100. The electronic circuitry 92100 includes an integrated electronic hardware system 92110 and an integrated software operating system 92120 stored and executable on the integrated electronic hardware system 92110. The hardware 92110 also may include an electric motor, or an electric actuator, such as an electromagnetic switching module, adapted to operate the door blocking mechanism by causing the door blocking mechanism to move between an non-blocking position and a blocking position, which may include having an actuator adapted to rapidly move the blocking parts between their non-blocking positions and blocking positions.

In some embodiments, the apparatus 90000 may enable a user to view, hear, or both, activity surrounding the apparatus 90000, such as on the safety side 11200, the threat side 11300, or both. The integrated electronic hardware system 92110 may include, for instance, an integrated camera 92111, an integrated microphone 92112, and an integrated speaker 92113 coupled to an internal processor 92114 coupled to an internal memory 92115 an internal power source 92116, an integrated data transfer module 92117 interoperable with the data transfer device 93000, and at least one integrated input device 92118 (e.g., button, keypad, keyboard, joystick, touchpad, etc.) operable from without the exterior housing 91000. The camera 92111, the microphone 92112, or a combination thereof, may be adapted to perform functions of monitoring video input, audio input, or a combination thereof, from surroundings of the door blocking apparatus 90000. The software 92120 and the hardware 92110 are adapted to enable a power user 90030 to set up the configurable apparatus console 90012, such as to create in the software 92120 and store in the memory 92115 a dataset 92130 including a first profile 92132 identifying a first participant 90020, and to download, install, select, and run an application 92134 and an application configuration 92136 for, and compatible with, a configurable application, such as application 92134.

The hardware 92110 further may include a mini display 92119, and wherein the software 92120 is adapted to render on the display 92119, for instance, a surveillance video, a settings menu, an audiovisual file, an image file, on-screen text, on-screen text-entry icons, or any combination thereof. The visual display 92119, the audio speaker 92113, or a combination thereof, may be adapted to perform functions of a visual output, an audible output, or a combination thereof, to surroundings of the door blocking apparatus 90000. In some embodiments, the display 92119 is touch-sensitive. Although the display 92119 may emit light, such as using a backlight or illuminated pixels, the hardware 92110 further may include a simple illumination device 92119' adapted to illuminate at least a portion of the exterior housing 91000. For instance, the illumination device 92119' may include a light emitting diode (LED) adapted to illuminate a portion of the exterior housing 91000 surrounding the input button 92118.

Various data settings of the apparatus 90000 may include creating the first profile 92132 to include, for example, entering a first name of the first participant and storing a first face image of a face of the first participant, and the camera 92111 and the software 92120 may be adapted to recognize the face of the first participant based on a comparison with the first face image. The user may associate the first face image with the user's profile for inclusion in the user's postings on the online security platform or security system. Moreover, the application configuration 92136 may be specific to the user's profile and may be configured to load automatically upon recognizing the face of the first participant within a specified distance of the apparatus 90000.

Among other possible variations, the software 92120 may be further adapted to enable the power user 90030 to select one of a plurality of languages programmed into the software 92120; to select one of a plurality of apparatus and system settings programmed into the software 92120; to set up the first profile by entering first profile parameters including a first gender, a first age, a first birthdate, a first race, a first ethnicity, or any combination thereof, of the first participant; and to configure the software 92120 to adjust interaction parameters based on the first profile parameters entered.

Technical variations may include, for example, having the camera 92111 and the software 92120 adapted to measure ambient light, motion, or both, such that the apparatus 90000 may be adapted to alternate between an inactive state and an active state based on measuring a presence or an absence of a minimum threshold of ambient light, motion, or both.

Figure 10:
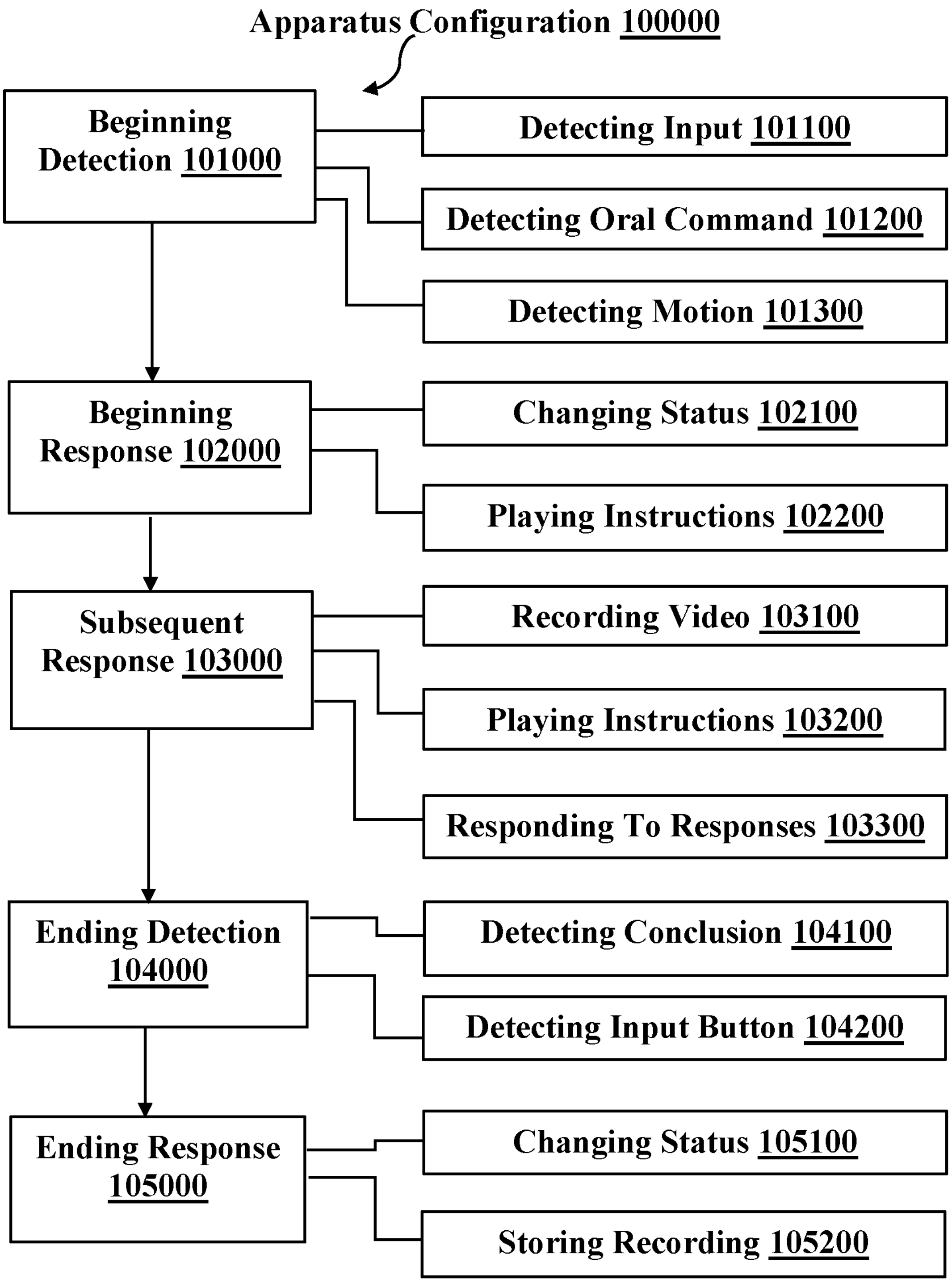
FIG. 10 shows a block diagram of a further embodiment of an electronically-equipped door blocking apparatus configuration, according to aspects of the invention.

Referring to FIG. 10, FIG. 10 shows a flow diagram of an exemplary implementation of a configuration 100000 of the apparatus 90000 of FIG. 9 according to aspects of the invention. The configuration 100000 may be adapted to perform, upon detecting an application configuration 92136, loading an apparatus configuration beginning detection 101000, an apparatus configuration beginning response 102000. For example, the beginning detection 101000 may include detecting the input button being activated (101100), detecting a command being spoken (101200), detecting motion proximate the camera (101300), or any combination thereof. Likewise, the beginning response 102000 may include changing a status (102100) of the apparatus 90000 from a blocking position to a non-blocking position upon identifying the first participant 90020, using the speaker to play an instruction (102200) instructing the first participant 90020 to activate the input button 92118 to launch the apparatus configuration 92136, or both, upon detecting the beginning detection 101000. Following the beginning response 102000, the apparatus console 90010 may be adapted to perform a subsequent response 103000, such as record, as an interaction audiovisual file in the memory, a video (103100) of an interaction (e.g., door being unblocked) of the first participant 90020 with the apparatus console 90010, during which interaction the apparatus console 90010 may use the speaker 92113 to play a plurality of verbal instructions or other recordings (103200) responsive to verbal responses (103300) of the first participant 90020.

The configured apparatus 100000 may be configured to have the software 92120 and the hardware 92110 further be adapted to enable a power user 90030 to set up the apparatus configuration 100000 to select an ending detection 104000 and an ending response 105000 to the ending detection 104000, wherein the apparatus configuration 100000 further is adapted to perform the ending response 105000 upon detecting the ending detection 104000. The ending detection 104000 may include, for instance, detecting a door closure as a conclusion to the interaction (104100), detecting the input button being activated (104200), or both, and the ending detection 104000 may initiate the ending response 105000 that concludes an interaction of the configured apparatus 100000 with the first participant 90020. The ending response 105000 may include using the speaker to play a reply farewell to the first participant, changing the status (105100) of the apparatus 90000, and storing a recording of the interaction as an interaction audiovisual file as a computer-readable file on a computer-readable storage medium (105200). The ending response 105000 might also include connecting to the Internet, connecting to an online security platform, and sending an alert to the power user to notify the power user that a participant has interacted with the apparatus 100000 and that a video of the interaction may be available on the online security platform and/or stored in the apparatus console.

Figure 11:
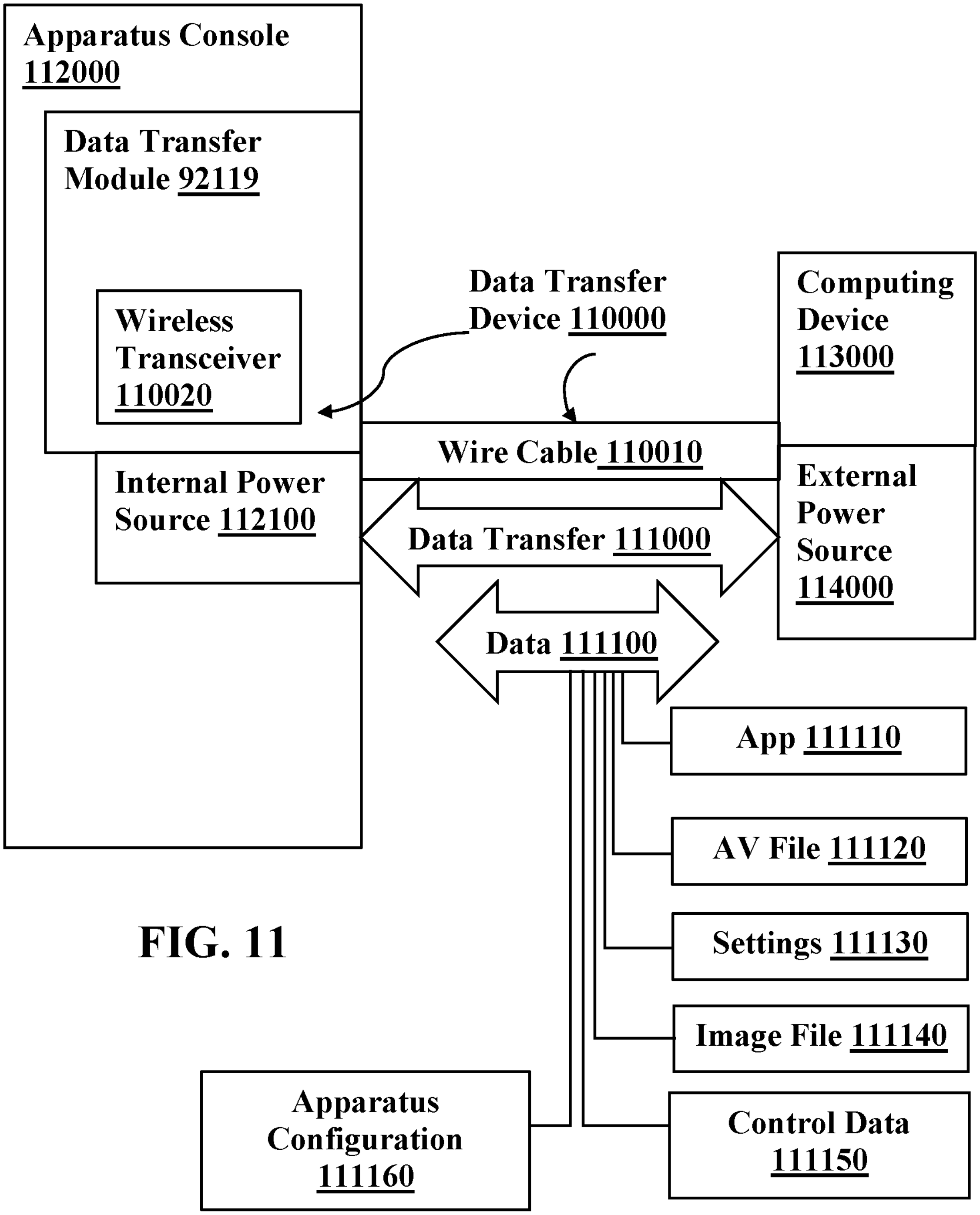
FIG. 11 shows a block diagram of another exemplary embodiment of an electronically-equipped door blocking apparatus of the present invention, according to aspects of the invention.

Referring to FIG. 11, FIG. 11 shows a block diagram of an exemplary embodiment 110000 of the present invention specific to a data transfer device 93000. A data transfer device 110000 may be adapted to enable a data transfer 111000 between an apparatus console 112000 and a separate computing device 113000, such as a server of an online security platform, wherein the data transfer device 110000 may be adapted to enable the apparatus console 112000 to communicate with and transfer electronic data 111100 to the separate computing device 112000 and to enable the separate computing device 113000 to communicate with and transfer electronic data 111100 to the apparatus console 112000. The data transfer device 110000 may include, for instance, a wire cable 110010, a wireless transceiver 110020, or both, wherein the apparatus console 112000 may be enabled to transfer to, or receive from, the separate computing device 113000, for example, a separate device software application 111110 and an interaction audiovisual file 111120. Likewise, the separate computing device 113000 may be enabled to transfer to, or receive from, the apparatus console 112000, for instance, a settings dataset 111130 and an image file 111140. For example, an app 111110 might include a control data 111150 executable instruction, and settings 111130 might include an apparatus configuration 111160. In addition, the wire cable 110010 may be adapted to enable the apparatus console 112000 to recharge an internal power source 112100 when the wire cable 110010 is coupled to an external power source 114000. Many wired security systems use 'low-voltage' wiring to connect devices, and such low-voltage wiring might be adapted to recharge a local internal power source 112100 that may be adapted to provide higher power outputs, for brief times, than the low-voltage external power source 114000 might be able to provide.

Figure 12:
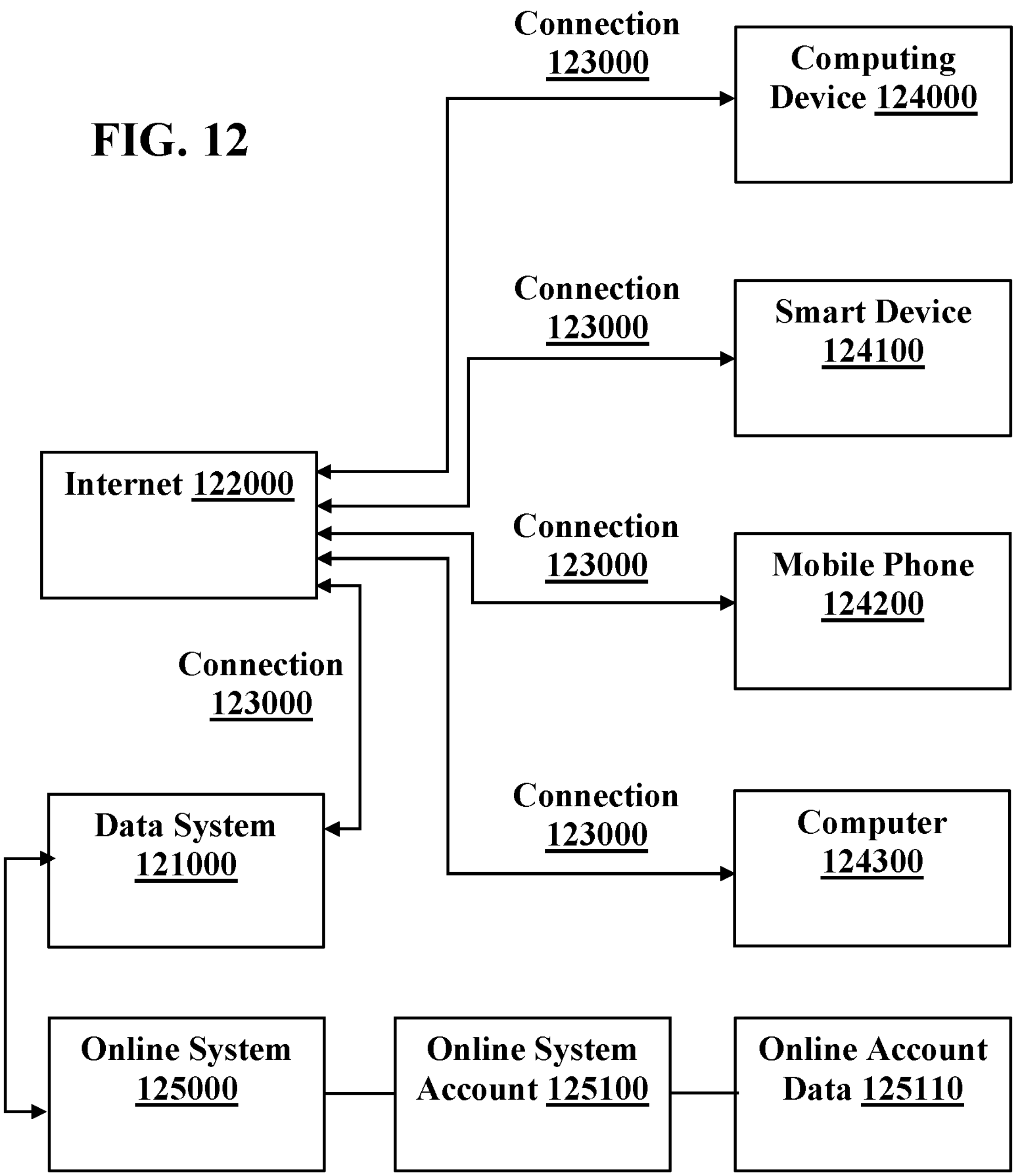
FIG. 12 shows a block diagram of an exemplary computer environment for use with the systems and methods in accordance with an embodiment of the present invention, and according to aspects of the invention.
Figure 13:
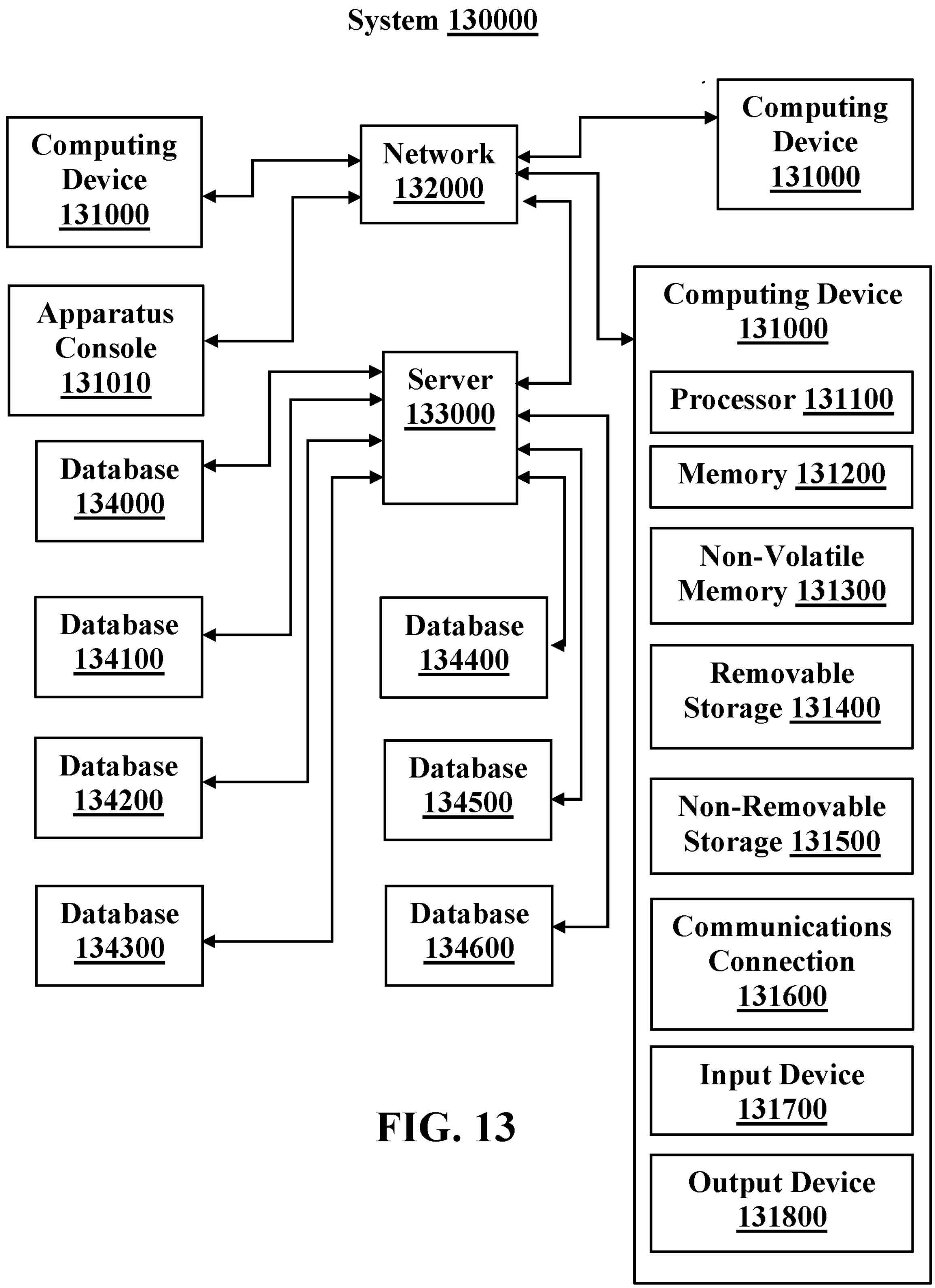
FIG. 13 shows a block diagram of an exemplary data system, and an exemplary set of databases/database tables for use with the exemplary computer environment, for use with systems and methods in accordance with an exemplary embodiment of the present invention, according to aspects of the invention.

Referring to FIG. 12 and FIG. 13 below, exemplary embodiments of the present invention may include a system for interactive communication adapted for protection, surveillance, and/or security of a participant, wherein the system comprises an online security platform, and possibly an integrated online communication platform, or a third-party social media platform or service, and an apparatus adapted to interact with the online security platform and the communication platform. The system further may comprise a separate device software application running on at least one separate computing device, wherein the separate device software application may be adapted to enable the separate computing device to interact with the apparatus console, modify settings of the apparatus console, upload data and files to the apparatus console, download data and files from the apparatus console, and control features and functions of the apparatus console.

The system further may comprise a remote computing network and a user account platform accessible via the remote computing network and adapted to communicate with and transfer electronic data to and from the online security platform and the apparatus console, adapted to communicate with and transfer electronic data to and from the separate computing device, and adapted to enable the apparatus console to communicate with and transfer electronic data to and from the separate computing device via the remote computing network. The system further may comprise a user account accessible via the user account platform that enables the power user to log into the user account to remotely manage, view, and share data and settings of the apparatus console and the user's account on the online security platform that are available in the user account via the remote computing network, either because the data and settings have been uploaded to the user account platform, or because the apparatus console is in communication with the user account platform via the remote computing network while the power user is accessing the user account platform and logged into the user account. In some embodiments, the user account may be adapted to enable the power user to set alert options to have an alert generated and sent to the separate computing device if an interaction with the first participant happens and notification of the interaction has been communicated from an apparatus console and the user account platform via the remote computing network. The user account further may be adapted to enable the power user to email, upload, download, otherwise electronically share, or any combination thereof, a surveillance video compilation, an apparatus configuration, or other data file, such as an interaction audiovisual file of a recording of an interaction of the first participant with the apparatus console.

The system further may comprise an apparatus configuration data file stored on the remote computing network and downloadable from the user account platform to the separate computing device and to the apparatus console, wherein the apparatus configuration data file is adapted to enable the apparatus console to add further features, perform additional functions, or both. An apparatus configuration may include, for instance, a map utility (e.g., a building plan layout, an ariel map, a road map, a topography map, a resources map, a route map, a perspective view map, a plan view map, a point-of-view map, etc.), a profile utility (e.g., switch points of view, reveal details, switch profiles, synchronization of accounts, etc.), a scheduling utility (e.g., days and times of blocking and unblocking activity, and of authorization escalations), and a user utility (e.g., a social media connection, a message feed, etc.). At the level of the apparatus console, the further features might be selected from the group consisting of further audio recordings, further video recordings, further voice recordings, and further illumination patterns; and wherein the additional functions might be selected from the group consisting of additional alert options, additional rules options, additional language options, additional voice recognition options, and additional video recognition options.

A user of the online security platform may be, for instance, a remote user of a security system, a security service provider, a user of a door blocking apparatus, an IT staff member, maintenance personnel, security personnel, administrative staff, first responders, or combinations thereof. A user may create and/or distribute a security data, an apparatus configuration, or both, by using the online security platform for user-based creation and/or distribution of security data and apparatus configurations. Each apparatus configuration may be software code in a configuration file that includes, for instance, one or more of a settings file, a configuration file, a profile file, an applet file, an application file, a plug-in file, an application protocol interface ("API") file, an executable file, a library file, an image file, a video file, a text file, a database file, a metadata file, and a message file. A user may develop the software code for the apparatus configuration file using, for instance, programming in coding languages, such as JavaScript and HTML, including open source code, or object-oriented code assembly. The software code would be adapted to be compatible with and executable by the software of an apparatus console on which a compatible application may be run, with which or within which the apparatus configuration would be used.

Referring to FIG. 12, FIG. 12 shows a diagram of an exemplary computer environment for use with the systems and methods in accordance with an embodiment of the present invention, and according to aspects of the invention. FIG. 12 illustrates a schematic diagram of an exemplary computer environment 120000 for creating, receiving, sending, exchanging, updating, and processing data in accordance with an embodiment of the present invention.

In the depicted embodiment, computer environment 120000 includes, inter alia, data system 121000, Internet 122000, connections 123000, and at least one computing device 124000, such as computing devices smart device/tablet/phone 124100, mobile phone 124200, and computer 124300. The data system 121000 may comprise an online security platform, possibly with its own integrated online communication service or system 125000, or connectable to a third-party social media system. The network 122000 may connect to an online system 125000 that accesses an online account 125100 for the transfer of online account data 125110. Computing devices 124100, 124200, and 124300 are connected to Internet 122000 via connections 123000, which may be any form of Internet connection known in the art or yet to be invented. Connections 123000 may include, but are not limited to, telephone lines (xDSL, T1, leased lines, etc.), cable lines, power lines, wireless transmissions, and the like. Computing devices 124100, 124200, and 124300 include any equipment necessary (e.g., modems, routers, etc.), as is known in the art, to facilitate such communication with the Internet. Data system 121000 is also connected to Internet 122000 using one of the aforementioned methods or other such methods known in the art.

Using an apparatus and a system such as at depicted in FIG. 9, FIG. 12, and FIG. 13, a user may access the computer environment 120000 via a computing device connected to Internet 122000 such as computing device 124100, 124200, and 124300. Such a computing device may be, for instance, the individual's personal computer, an Internet café computer, an Apple iPod™, a computerized portable electronic device (e.g., a personal data assistant, cell phone, etc.), or the like. Using the apparatus and system exemplified in FIG. 9, FIG. 12, and FIG. 13, such user access may include a download of data to, and/or an upload of data (e.g., an electronic form of information) from, a computing device 124100, 124200, and 124300 via Internet 122000 to data system 121000 (e.g., server, mainframe, computer, etc.), wherein data system 121000 is typically provided and/or managed by the entity implementing the process or its affiliate, subcontractor, or the like.

However, alternate embodiments of user access may be substituted without departing from the scope hereof. For example, in one aspect of the present invention, the user transmits the data directly to the entity implementing the process in electronic format without upload (e.g., via electronic mail). Such transmission may also be performed at a computing device 124100, 124200, or 124300 via Internet 122000, however, in this scenario, manipulation by the entity's staff or systems may be required prior to transferring the information to data system 121000.

Although the systems and methods disclosed herein have focused on embodiments in which user access initiates the process, one of skill in the art may easily appreciate that such systems and methods may be equally applied for other scenarios in which the process is not initiated by the user.

Referring to FIG. 13, FIG. 13 shows a block diagram of an exemplary data system for use with systems and methods in accordance with an exemplary embodiment of the present invention, according to aspects of the invention. In addition, FIG. 13 shows an exemplary set of databases/database tables for use with the exemplary computer environment, in accordance with the exemplary embodiment of the present invention, according to aspects of the invention. FIG. 13 depicted herein represents an exemplary computing system environment for allowing a user of system 130000 to perform the methods described with respect to FIG. 9, FIG. 10, FIG. 11, and FIG. 12.

The depicted computing system environment is only one example of a suitable computing environment and is not intended to suggest any limitation as to the scope of use or functionality. Numerous other general-purpose or special-purpose computing system environments or configurations may be used. Examples of well-known computing systems, environments, and/or configurations that may be suitable for use include, but are not limited to, personal computers ("PCs"), server computers, handheld or laptop devices, multi-processor systems, microprocessor-based systems, network PCs, minicomputers, mainframe computers, cell phones, tablets, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 13 depicts an exemplary system 130000 for implementing embodiments of the present invention. This exemplary system includes, inter alia, one or more computing devices 131000, a network 132000, and at least one server 133000, which interface to each other via network 132000. A computing device 131000 may include an apparatus and an apparatus console 131010 such as described in the embodiments of FIG. 9, FIG. 10, and FIG. 11. In its most basic configuration, computing device 131000 includes at least one processing unit, processor 131100, and at least one memory unit 131200. Depending on the exact configuration and type of the computing device, memory 131200 may be volatile (such as random access memory ("RAM")), non-volatile (such as read-only memory ("ROM"), flash memory, etc.), or some combination of the two. This basic configuration is illustrated in FIG. 13. In addition to that described herein, computing devices 131000 can be any web-enabled handheld device (e.g., cell phone, smart phone, or the like) or personal computer including those operating via Android, Apple, and/or Windows mobile or non-mobile operating systems.

Computing device 131000 may have additional features and/or functionality. For example, computing device 131000 may include additional storage (removable and/or non-removable) including, but not limited to, magnetic or optical disks or tape, thumb drives, and external hard drives as applicable. Such additional storage is illustrated in FIG. 13 by removable storage 131400 and non-removable storage 131500.

Computing device 131000 typically includes or is provided with a variety of computer-readable media. Computer-readable media can be any available media that can be accessed by computing device 131000 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 131200, removable storage 131400, and non-removable storage 131500 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information, and which can be accessed by computing device 131000. Any such computer storage media may be part of computing device 131000 as applicable.

Computing device 131000 may also contain a communications connection 131600 that allows the device to communicate with other devices. Such communications connection 131600 is an example of communication media. Communication media typically embodies computer-readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 131000 may also have input device(s) 131700 such as a keyboard, mouse, pen, camera, light sensor, voice input device, touch input device, etc. Output device(s) 131800 such as a display, speakers, printer, etc., may also be included. All these devices are generally known to the relevant public and therefore need not be discussed in any detail herein except as provided.

Notably, computing device 131000 may be one of a plurality of computing devices 131000 inter-connected by a network 132000. As may be appreciated, network 132000 may be any appropriate network and each computing device 131000 may be connected thereto by way of connection 131600 in any appropriate manner, and each computing device 131000 may communicate with one or more of the other computing devices 131000 in network 132000 in any appropriate manner. For example, network 132000 may be a wired network, wireless network, or a combination thereof within an organization or home or the like, and may include a direct or indirect coupling to an external network such as the Internet or the like. Likewise, the network 132000 may be such an external network.

Computing device 131000 may connect to a server 133000 via such an internal or external network. Server 133000 may serve, for instance, as an online security platform, a security service/system, or both. Although FIG. 13 depicts computing device 131000 located in close proximity to server 133000, this depiction is not intended to define any geographic boundaries. For example, when network 132000 is the Internet, computing device can have any physical location. For example, computing device may be a tablet, cell phone, personal computer, or the like located at any user's office, home, or other venue, etc. Or computing device could be located proximate to server 133000 without departing from the scope hereof. Also, although FIG. 13 depicts computing devices 131000 coupled to server 133000 via network 132000, computing devices may be coupled to server 133000 via any other compatible networks including, without limitation, an intranet, local area network, or the like.

The system may use a standard client server technology architecture, which allows users of the system to access information stored in the relational databases via custom user interfaces. The application is hosted on a server such as server 133000 which is accessible via the Internet using a publicly addressable Uniform Resource Locator ("URL"). For example, users can access the system using any web-enabled device equipped with a web browser. Communications between software components and sub-systems are achieved by a combination of direct function calls, publish and subscribe mechanisms, stored procedures, and direct SQL queries.

In some embodiments, for instance, server 133000 may be an Edge R200 server as manufactured by Dell, Inc., however, alternate servers may be substituted without departing from the scope hereof. System 130000 and/or server 133000 utilize a PHP scripting language to implement the processes described in detail herein. However, alternate scripting languages may be utilized without departing from the scope hereof.

An exemplary embodiment of the present invention may utilize, for instance, a Linux variant messaging subsystem. However, alternate messaging subsystems may be substituted including, without limitation, a Windows Communication Foundation ("WCF") messaging subsystem of a Microsoft Windows operating system utilizing a .NET Framework 3.0 programming interface.

Also, in the depicted embodiment, computing device 131000 may interact with server 133000 via a Transmission Control Protocol/Internet Protocol ("TCP/IP") communications protocol; however, other communication protocols may be substituted.

Computing devices 131000 may be equipped with one or more Web browsers to allow them to interact with server 133000 via a HyperText Transfer Protocol ("HTTP"). HTTP functions as a request-response protocol in client-server computing. For example, a web browser operating on computing device 131000 may execute a client application that allows it to interact with applications executed by server 133000. The client application submits HTTP request messages to the server. Server 133000, which provides resources such as HTML files and other content, or performs other functions on behalf of the client application, returns a response message to the client application upon request. The response typically contains completion status information about the request as well as the requested content. However, alternate methods of computing device/server communications may be substituted without departing from the scope hereof.

In the exemplary system 130000, server 133000 includes one or more databases 134000 as depicted in FIG. 13, which may include a plurality of database tables including, without limitation, Templates, Users, Events, User Uploads, Admin Info, Transactions, Status, Tracking, and/or Location database tables, e.g., 134100 through 134600. As may be appreciated, database(s) 134000 may be any appropriate database capable of storing data and it may be included within or connected to server 133000 or any plurality of servers similar to 133000 in any appropriate manner.

In the exemplary embodiment of the present invention depicted in FIG. 13, database(s) 134000 may be structured query language ("SQL") database(s) with a relational database management system, namely, MySQL as is commonly known and used in the art. Database(s) 134000 may be resident within server 133000. However, other databases may be substituted without departing from the scope of the present invention including, but not limited to, PostgreSQL, Microsoft® SQL Server 2008 MySQL, Microsoft® Access®, and Oracle databases, and such databases may be internal or external to server 133000.

The various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the interface unit generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a system 130000 or a distributed computing environment 120000. Still further, aspects of the presently disclosed subject matter may be implemented in or across a plurality of processing chips or devices, and storage may similarly be effected across a plurality of devices in system 130000. Such devices might include personal computers, network servers, and handheld devices (e.g., cell phones, tablets, smartphones, etc.), for example.

In the exemplary embodiment, server 133000 and its associated databases are programmed to execute a plurality of processes including those shown in FIG. 9, FIG. 10, and FIG. 11 as discussed in greater detail herein.

Methods in accordance with aspects of the invention include, for instance, a method for reducing a likelihood of, and possibly preventing, opening of a door by unauthorized personnel, wherein the method includes providing a door blocking apparatus adapted to be operable to block and unblock the opening of a closed door, and enabling operation of the door blocking apparatus. The method further may comprise a method for interactive protection of a participant, and possible electronic interaction with the participant, using a door blocking apparatus; configuring the apparatus to interact with the participant; enabling the apparatus to interact with the participant; and capturing electronically in the apparatus audio data, video data, or both, of an interaction of the apparatus with the participant. Further embodiments of the method may include performing the actions associated the functionalities set forth in FIG. 9, FIG. 10, FIG. 11, FIG. 12, and FIG. 13, such as within the apparatus console of apparatus 90000, within the computing environment 120000, and within the system 130000.

The foregoing description discloses exemplary embodiments of the invention. While the invention herein disclosed has been described by means of specific embodiments and applications thereof, numerous modifications and variations could be made thereto by those skilled in the art without departing from the scope of the invention set forth in the claims. Modifications of the above disclosed apparatus and methods that fall within the scope of the claimed invention will be readily apparent to those of ordinary skill in the art. Accordingly, other embodiments may fall within the spirit and scope of the claimed invention, as defined by the claims that follow hereafter.

Although several processes have been disclosed herein as software, it may be appreciated by one of skill in the art that the same processes, functions, etc. may be performed via hardware or a combination of hardware and software. Similarly, although certain aspects of the present invention have been depicted as a hardwired system, these concepts may be applied to wireless systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In the description above, numerous specific details are set forth in order to provide a more thorough understanding of embodiments of the invention. It will be apparent, however, to an artisan of ordinary skill that the invention may be practiced without incorporating all aspects of the specific details described herein. Not all possible embodiments of the invention are set forth verbatim herein. A multitude of combinations of aspects of the invention may be formed to create varying embodiments that fall within the scope of the claims hereafter. In addition, specific details well known to those of ordinary skill in the art have not been described in detail so as not to obscure the invention. Readers should note that although examples of the invention are set forth herein, the claims, and the full scope of any equivalents, are what define the metes and bounds of the invention protection.

What is claimed is:

1. A door blocking apparatus for a door comprising:

an apparatus handle located on a safety side of the door; and at least one blocking part coupled to the apparatus handle, the at least one blocking part attachable in a single location on a safety side surface adjacent a first side of a closed door, the at least one blocking part movable between a blocking position and a non-blocking position, the at least one blocking part substantially blocking the door from rotating from a closed position when the at least one blocking part is in the blocking position, and the at least one blocking part allowing the door to rotate freely when the at least one blocking part is in the non-blocking position; and a lock core located on a threat side of the door coupled to the at least one blocking part.

2. An apparatus according to claim 1, the at least one blocking part coupled to the apparatus handle via a torque transfer rod.

3. An apparatus according to claim 1, wherein rotating the apparatus handle ninety degrees changes the at least one blocking part from the non-blocking position to the blocking position.

4. The apparatus according to claim 1, further comprising:

a door frame interior plate for attachment between the at least one blocking part and the safety side surface.

5. The apparatus according to claim 4, wherein the door frame interior plate is mounted to a door frame or structural framing of a wall surrounding the door frame.

6. The apparatus according to claim 1, wherein the at least one blocking part includes:

a plurality of positioning members joined to the safety side surface or a door frame interior plate via at least one first fastener; and at least one blocking member, the at least one blocking member joined to the plurality of positioning members by at least one second fastener.

7. The apparatus according to claim 6, wherein the torque transfer rod is operably connected to at least one of the plurality of positioning members.

8. The apparatus according to claim 6, wherein a first major axis of the at least one blocking member is parallel to the axis of rotation of the door in both the blocking position and the non-blocking position.

9. The apparatus according to claim 1 further comprising:

a door frame exterior plate attachable on a threat side of the door opposite a door frame interior plate or the at least one blocking part.

10. The apparatus according to claim 1 further comprising:

a key slot coupled to the lock core on the threat side of the door; and a lock key;

wherein the at least one blocking part is moveable between a blocking position and non-blocking position via insertion of the lock key into the key slot and rotation of the lock key.

11. The apparatus according to claim 10, the lock core further comprising:

a rotatable housing.

12. The apparatus according to claim 11, wherein the rotatable housing is disposed around the lock core and minimizes tampering with the lock core.

13. The apparatus according to claim 10, wherein the lock key has a key handle;

wherein insertion of the lock key into the key slot and rotation of the key handle operates the at least one blocking part between the blocking position and the non-blocking position.

14. The apparatus according to claim 1, further comprising:

an electrical contact, the contact switching state upon the blocking apparatus changing from a blocking position to a non-blocking position.

15. The door blocking apparatus according to claim 1, further comprising:

an apparatus cover, comprising:

a door-frame cover, adapted to be attached to the door frame; and a door cover, adapted to be attached to the door.

16. A door blocking apparatus for a door comprising:

an apparatus handle located on a safety side of the door;

at least one blocking part coupled to the apparatus handle, the at least one blocking part attachable in a single location on a safety side surface adjacent a first vertical side of a closed door, the first vertical side opposite a second vertical side, the second vertical side including at least one hinge of the door, the at least one blocking part movable between a blocking position and a non-blocking position, the at least one blocking part substantially blocking the door from rotating from a closed position when the at least one blocking part is in the blocking position, and the at least one blocking part allowing the door to rotate freely when the at least one blocking part is in the non-blocking position; and wherein rotating the apparatus handle ninety degrees changes the at least one blocking part from the non-blocking position to the blocking position.

17. The door blocking apparatus according to claim 16, further comprising:

an apparatus cover, further comprising:

a door-frame cover, adapted to be attached to the door frame; and a door cover, adapted to be attached to the door.

18. A method of retaining a door in a closed position comprising the steps of:

placing the door in the closed position;

rotating an apparatus handle to move at least one blocking part from an unblocking position to a blocking position, the apparatus handle located on a safety side of the door; and the at least one blocking part coupled to the apparatus handle, the at least one blocking part attachable in a single location on a safety side surface adjacent a first side of a closed door, the at least one blocking part movable between the blocking position and the non-blocking position, the at least one blocking part substantially blocking the door from rotating from a closed position when the at least one blocking part is in the blocking position, and the at least one blocking part allowing the door to rotate freely when the at least one blocking part is in the non-blocking position rotating an apparatus handle to move the at least one blocking part from the blocking position to the unblocking position via insertion of a lock key into a key slot located on the threat side of the door and rotation of the lock key.

19. A method according to claim 18 further comprising the step of:

rotating an apparatus handle to move the at least one blocking part from the blocking position to the unblocking position via rotation of the apparatus handle.

20. A method according to claim 18 wherein the safety side of the door is one of a frame, a wall, combinations thereof.

* * * * *